(12) United States Patent
Poras et al.

(10) Patent No.: US 12,391,710 B2
(45) Date of Patent: Aug. 19, 2025

(54) METHOD FOR THE INDUSTRIAL PREPARATION OF THE DISODIUM SALT OF ((2S)-3-([1,1'-BIPHENYL]-4-YL-2-((HYDROXY((1R)-1-(((1-(ISOBUTYRYLOXY)ETHOXY) CARBONYL)AMINO)ETHYL)PHOSPHORYL) METHYL)PROPANOYL)-L-ALANINE

(71) Applicant: PHARMALEADS, Paris (FR)

(72) Inventors: Hervé Poras, Villepreux (FR); Alain Priour, Rennes (FR); Guillaume Grach, Liffre (FR); Roberto Fanelli, Bollate (IT); Xinjun Zhao, Dalian (CN)

(73) Assignee: KOS THERAPEUTICS, INC., Raleigh, NC (US)

( * ) Notice: Subject to any disclaimer, the term of this patent is extended or adjusted under 35 U.S.C. 154(b) by 562 days.

(21) Appl. No.: 17/784,533

(22) PCT Filed: Dec. 11, 2020

(86) PCT No.: PCT/FR2020/052385
§ 371 (c)(1),
(2) Date: Jun. 10, 2022

(87) PCT Pub. No.: WO2021/116617
PCT Pub. Date: Jun. 17, 2021

(65) Prior Publication Data
US 2023/0041504 A1 Feb. 9, 2023

(30) Foreign Application Priority Data
Dec. 11, 2019 (FR) ...................................... 1914158

(51) Int. Cl.
*C07F 9/30* (2006.01)

(52) U.S. Cl.
CPC .......... *C07F 9/301* (2013.01); *C07B 2200/13* (2013.01)

(58) Field of Classification Search
None
See application file for complete search history.

(56) References Cited

U.S. PATENT DOCUMENTS

2011/0124601 A1   5/2011   Roques et al.

FOREIGN PATENT DOCUMENTS

| EP | 2740736 A1 | 6/2014 |
|---|---|---|
| WO | WO-2010/010106 A1 | 1/2010 |

OTHER PUBLICATIONS

International Search Report and Written Opinion for Corresponding International Application No. PCT/FR2020/052385, mailing date Feb. 26, 2021.

Baylis et al., "1-Aminoalkylphosphonous Acids. Part 1. Isostered of the Protein Amino Acids" J. Chemical. Soc. Perkin Trans T, (1984) pp. 2845-2853.

Bonnard et al. "Long-lasting oral analgesic effects of N-protected aminophosphinic dual ENKephalinase inhibitors (DENKIs) in peripherally controlled pain" in Pharmacol. Research Perspectives. (2015), 3(2), pp. 1-15, e00116.

Hamilton et al., "A Highly Convenient Route to Optically Pure a-Aminophosphonic Acids" Tetrahedron Letters, vol. 36, No. 25, pp. 4145-4454, (1995).

Allen et al., "Ethyl Benzalmalonate" Organic Synthesis Coll. vol. 3 p. 337, (1995).

*Primary Examiner* — Amy C Bonaparte
(74) *Attorney, Agent, or Firm* — MARSHALL, GERSTEIN & BORUN LLP

(57) ABSTRACT

The present invention relates to a method for the industrial preparation of ((2S)-3-([1,1'-biphenyl]-4-yl)-2-((((R)-1-aminoethyl)(hydroxy)phosphoryl)methyl)propanoyl)-L-alanine acid of following formula (E):

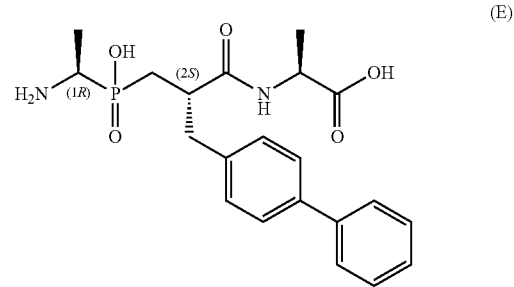

(E)

from (S)-1-phenylethylamine via a multi-step synthesis. The present invention pertains to a method for the industrial preparation of the disodium salt of ((2S)-3-([1,1'-biphenyl]-4-yl)-2-((hydroxy((1R)-1-(((1-(isobutyryloxy)ethoxy)carbonyl)amino)ethyl)phosphoryl)methyl)propanoyl)-L-alanine of following formula (1):

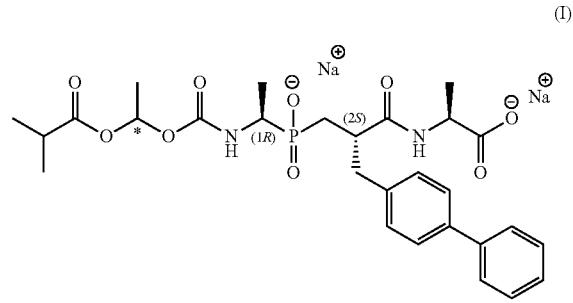

(I)

in two additional steps from the compound (E) such as defined above.

The present invention also pertains to a method for diastereoisomeric enrichment of the intermediates of the method for the industrial preparation of the compound of formula (E) of the present invention.

13 Claims, No Drawings

METHOD FOR THE INDUSTRIAL PREPARATION OF THE DISODIUM SALT OF ((2S)-3-([1,1'-BIPHENYL]-4-YL-2-((HYDROXY ((1R)-1-(((1-(ISOBUTYRYLOXY)ETHOXY) CARBONYL)AMINO)ETHYL)PHOSPHORYL) METHYL)PROPANOYL)-L-ALANINE

CROSS-REFERENCE TO RELATED APPLICATIONS

This application is a U.S. National stage of International Patent Application No. PCT/FR2020/052385 filed Dec. 11, 2020, which claims the benefit of priority of French Patent Application No. 1914158 filed Dec. 11, 2019, the respective disclosures of which are each incorporated herein by reference in their entireties.

FIELD OF THE INVENTION

The present invention relates to a novel industrial method for the preparation of the disodium salt of ((2S)-3-([1,1'-biphenyl]-4-yl)-2-((hydroxy((1R)-1-(((1-(isobutyryloxy)ethoxy) carbonyl)amino)ethyl)phosphoryl)methyl)propanoyl)-L-alanine from (S)-1-phenylethylamine.

BACKGROUND OF THE INVENTION

The disodium salt of ((2S)-3-([1,1'-biphenyl]-4-yl)-2-((hydroxy((1R)-1-(((1-(isobutyryloxy) ethoxy)carbonyl) amino)ethyl)phosphoryl)methyl)propanoyl)-L-alanine, designated compound (1) of following formula:

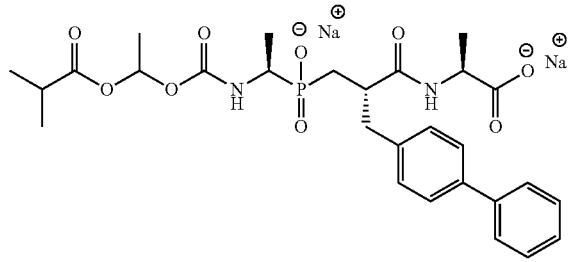

(I)

is a pro-drug of ((2S)-3-([1,1'-biphenyl]-4-yl)-2-((((R)-1-aminoethyl)(hydroxy)phosphoryl)methyl)propanoyl)-L-alanine aminophosphinic acid (designated compound (E) in the present description) which is a selective double inhibitor of neutral aminopeptidase (NAP) and neprilysin (NEP).

Compound (1) has been described as having an important analgesic effect by Bonnard et al. in *Pharmacol. Res. Perspect.*, 2015, 3(2), e00116.

Compound (1) and the use thereof as an analgesic were described for the first time in the patent application WO2010/010106. The method illustrated in this application enables the preparation, in 4 steps, of ((R)-1-(((benzyloxy) carbonyl)amino)ethyl)phosphinic acid (Example 1, step 3) from diphenylmethylamine hydrochloride. This aminophosphinic acid next reacts with 2-([1,1'-biphenyl]-4-ylmethyl) acrylic acid to give, in 6 additional steps, compound (1). This synthesis method notably necessitates lyophilisation at the final step.

Technical aspects specifically linked to the synthesis, in particular lyophilisation, the number of equivalents, the use of certain difficult to handle reagents and/or purification techniques involved in this process, do not make it possible to transpose the synthesis route described in WO2010/010106 to the industrial scale. In particular:

a step of chemical resolution with (R)-methylbenzyl amine of the racemic compound obtained for the 2$^{nd}$ step of the method (see Example 1, step 3), strongly impacts the yield of this step since, as described in the publication of Baylis et al, *J. Chem. Soc.*, Perkin trans. I 1984, p. 2846-2853, at least half of the product is lost (86% of the correct stereoisomer are recovered, representing 50% of the starting racemic mixture, i.e. an overall yield of the correct stereoisomer of 43% for this step);

a step of saponification is also carried out (see Example 3, step 2). This particular reaction is difficult to implement on the industrial scale, notably due to the considerable quantities of benzyl alcohol generated making isolation difficult and introducing the formation of important impurities;

a deprotection in strongly acidic medium (HBr 33% in acetic acid) is necessary for the deprotection to give the compound described in Example 3, step 2. This deprotection necessitates important quantities of corrosive acid, difficult to remove;

a purification on silica column to remove the by-product (4-nitrophenol) of step 3 and thus to give the compound described in Example 3, step 3;

the necessity of deprotecting the compound of Example 3, step 4 during a penultimate step to give the compound of Example 4, which will next be salified during the final step, to give compound (1);

in addition, this synthesis necessitates using diphenylmethylamine as starting product which has a very consequent impact on the cost of the raw materials.

An important objective for the development of a large scale organic synthesis is to find synthesis methods that are perfectly transposable to industrial conditions. In this respect, different parameters of the synthesis may be optimised, such as notably the solvents, preferably as lowly volatile as possible, in order to be easily recoverable; and the temperatures used, preferably in an easily accessible temperature range. It is also advantageous that the purification of the different intermediates and products can be carried out in an easy manner and in conditions compatible with large scale. Finally, the mixtures and the products of the reactions are, preferably, isolated and thermally stable.

Good manufacturing practices (GMP) have been defined for the preparation of pharmaceutical products that can be administered to humans or animals. GMP directives necessitate a quality approach for manufacture, thus allowing enterprises to minimise or to eliminate cases of contaminations, confusions and errors.

To the knowledge of the inventors, no industrial method making it possible to synthesise compound (1) has been described to date. Consequently, there exists a need to develop a method for synthesising compound (I) that can be adapted, easily and efficiently, to the industrial scale, in particular a method in which toxic solvents, column chromatographies and lyophilisation are not used. In addition, it would be interesting that this synthesis method makes it possible to reduce the number of steps and the cost of the associated raw materials.

DESCRIPTION OF THE INVENTION

The present invention pertains to a method for the industrial preparation of the disodium salt of ((2S)-3-([1,1'-biphenyl]-4-yl)-2-((hydroxy((1R)-1-(((1-(isobutyryloxy)ethoxy)

carbonyl) amino)ethyl)phosphoryl)methyl)propanoyl)-L-alanine of following formula (I):

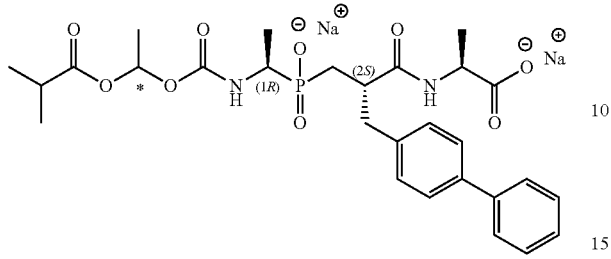

in which the notations (1R) and (2S) designate the position of the atoms to which they refer within the molecule as well as their absolute configuration. The notation * indicates a chiral carbon.

The method of the present invention comprises the following successive steps:
(1) preparation of the compound of following formula (A):

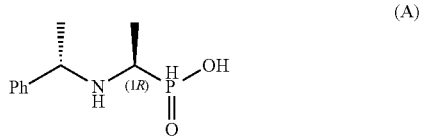

by:
(1a) reaction of (S)-1-phenylethylamine in a polar and protic solvent with an aqueous solution of hypophosphorous acid H₃PO₂ and acetaldehyde in the presence of a molar equivalent of hydrochloric acid, more or less 0.1 equivalent, with respect to (S)-1-phenylethylamine, then
(1b) treatment of the salt resulting from step (1a) with propylene oxide, then
(1c) crystallisation using a polar and protic solvent and recovery of the compound of formula (A) by filtration,
(2) Preparation of the compound of following formula (B):

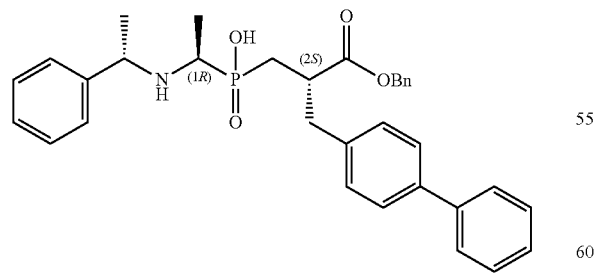

by:
(2a) reaction of the compound of formula (A) derived from step (1) with the benzylic ester of (2-(4-biphenyl)methyl)acrylate in the presence of a source of trimethylsilyl groups, then (2b) recovery of the compound of formula (B) by:
(2b.1) crystallisation using a mixture of apolar aprotic solvent and water then filtration, or
(2b.2) trituration in acetone, filtration and evaporation of the filtrate.
(3) Preparation of the compound of following formula (C):

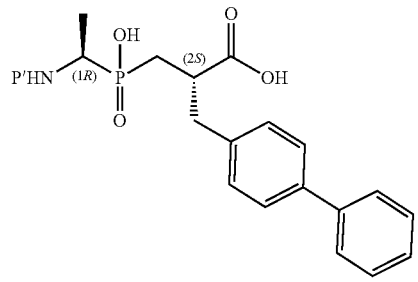

in which P' is a protective group of the amine function, by:
(3a) hydrogenolysis of the compound of formula (B) under hydrogen atmosphere in the presence of 10% by weight of Pd/C with respect to the weight of the compound of formula (B), then
(3b) protection of the amine resulting from step (3a) with a protective group P' and recovery of the compound of formula (C),
(4) preparation of the compound of following formula (E):

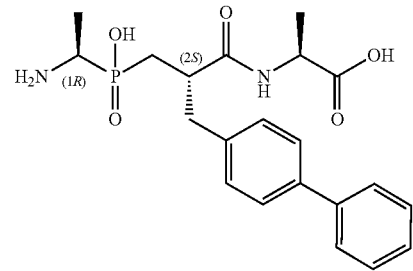

by:
(4a) peptide coupling of the compound of formula (C) with the tert-butyl ester of (L)-alanine and recovery of the compound of following formula (D):

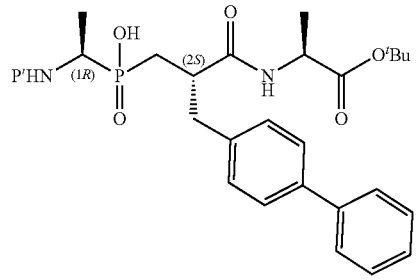

(4b) deprotection of the protective group P' in N-terminal position and the tert-butyl group in C-terminal position and recovery of the compound of formula (E), (5) preparation of the compound of following formula (F):

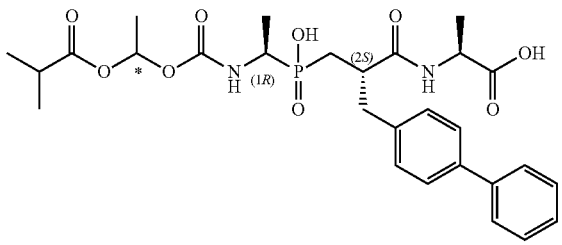

(F)

by reaction of the compound of formula (E) with acyloxyalkyl N-hydroxysuccinimide in the presence of a base, then (6) recovery of the compound of formula (I) by precipitation in an apolar aprotic solvent in the presence of a sodium salt of a weak base.

Another object of the present invention pertains to a method for the industrial preparation of ((2S)-3-([1,1'-biphenyl]-4-yl)-2-((((1R)-1-aminoethyl)(hydroxy)phosphoryl)methyl) propanoyl)-L-alanine acid of formula (E) comprising the successive steps (1) to (4) such as defined above.

The present invention also pertains to a method for diastereoisomeric enrichment of the intermediates of the method for the industrial preparation of the compound of formula (E) of the present invention.

Another object of the present invention relates to the synthesis intermediate of formula (B) such as described above.

DETAILED DESCRIPTION OF THE INVENTION

In the description that follows, unless stated otherwise, all percentages are expressed in molar percentages.

The present invention relates to a multi-step synthesis for the industrial preparation of ((2S)-3-([1,1'-biphenyl]-4-yl)-2-((((1R)-1-aminoethyl)(hydroxy)phosphoryl)methyl) propanoyl)-L-alanine acid of formula (E) and further the disodium salt of ((2S)-3-([1,1'-biphenyl]-4-yl)-2-((hydroxy ((1R)-1-(((1-(isobutyryloxy)ethoxy)carbonyl)amino)ethyl) phosphoryl) methyl)propanoyl)-L-alanine of formula (I).

"First alternative of the invention" designates the alternative according to which the synthesis of the compound of formula (B) involves the carrying out of step (2b.1), advantageously directly following step (2a). Step (2b.2) is thus not carried out. According to this alternative, the compound of formula (B) derived from step (2b) has an optical purity (2S/2R) greater than or equal to 95/5. This enantiomeric enrichment is next conserved in the course of each of steps (3) and (4) for the synthesis of compounds (C), (D) and (E). Thus, according to this first alternative, each of compounds (B), (C), (D) and (E) correspond to the diastereoisomer such as represented in the corresponding formulas with a diastereoisomeric excess strictly greater than 95%, more preferably greater than 99%.

"Second alternative of the invention" designates the alternative according to which the synthesis of the compound of formula (B) involves the carrying out of step (2b.2) advantageously directly following step (2a). Step (2b.1) is thus not carried out. According to this alternative, the compound of formula (B) derived from step (2b) has an optical purity (2S/2R) strictly greater than 50/50 and less than or equal to 95/5, notably comprised between 51/49 and 60/40. According to this second alternative, the diastereoisomeric enrichment steps may be carried out following each of steps (3) and (4) in order to increase the diastereoisomeric excess of each of compounds (C) and (E).

According to the present invention, unless stated otherwise, compounds (A), (F) and (1) correspond to the enantiomer or diastereoisomer such as represented in the corresponding formulas with an enantiomeric or diastereoisomeric excess advantageously strictly greater than 95%, more preferably greater than 99%.

It should be noted that the term "enantiomeric excess" or "diastereoisomeric excess" is interchangeable with the terms "optical purity" and "chiral purity". "Optical purity (XR/XS) greater than Y/Z" is taken to mean, in the sense of the present invention, that the atom in position X is a chiral centre that is found at Y % in the R form and at Z % in the S form.

"Optical purity XR/XS strictly greater than 50/50" is taken to mean, in the sense of the present invention, that the enantiomer XR is found in proportion strictly greater than the enantiomer XS.

"Concentrated hydrochloric acid" is taken to mean, in the sense of the present invention, an aqueous solution of hydrochloric acid comprising between 33% and 37% by weight of hydrochloric acid, preferably it is a 37% in percentage by weight concentrated solution.

"Source of trimethylsilyl groups" is taken to mean, in the sense of the present invention, a chemical compound capable of providing one or more trimethylsilyl (TMS) groups of formula —Si(CH$_3$)$_3$. In other words, when it reacts with another compound, the TMS source compound may transmit one or more TMS groups to said compound. These TMS source compounds are generally used as reagents for protecting functional groups such as hydroxyls or amines with TMS groups. Examples of TMS source compounds are N,O-bis(trimethylsilyl)acetamide (BSA), TMS chloride (TMSCl), TMS triflate (TMSOTf) and hexamethyldisilazane (HMDS).

"Room temperature" is taken to mean, in the sense of the present invention, a temperature comprised between 15° C. and 30° C., preferably between 18° C. and 25° C.

The word "equivalent" in the present description designates a molar equivalent, unless stated otherwise.

"Protective group" is taken to mean, in the sense of the present invention, a group which makes it possible to protect a reactive chemical function against undesirable reactions such as the groups described by T. W. Greene, "Protective Groups In Organic synthesis", (John Wiley & Sons, New York (1981)) and Harrison et al. "Compendium of Synthetic Organic Methods", Vols. 1 to 8 (J. Wiley & sons, 1971 to 1996).

"Partial racemisation" is taken to mean, in the sense of the present invention, the transformation of a so-called "pure" enantiomer, that is to say having an enantiomeric excess of at least 95%, preferably at least 99%, into a mixture of two enantiomers of the same compound, the two enantiomers being in unequal quantities, with a majority enantiomer compared to the other, unlike a total racemisation where the two enantiomers are going to be found in identical quantities (then designated a racemic mixture).

The expression "on the $2^{nd}$ carbon", in the present invention, refers to the carbon noted in position 2 according to the IUPAC notation such as represented in formulas (B), (C), (D), (E), (F) and (I) above, bearing the methyl-biphenyl group.

The following abbreviations are used in the present description:
Bn: benzyl,
HPLC: High Performance Liquid Chromatography,
TMS: trimethylsilyl,
BSA: N,O-bis(trimethylsilyl)acetamide,
TMSOTf: TMS triflate,
HMDS: hexamethyldisilazane,
MTBE: methyl tert-butyl ether,
THF: tetrahydrofuran,
DMF: dimethylformamide,
Boc: tert-butoxycarbonyl,
CBz: benzyloxycarbonyl,
TBTU: tetrafluoroborate of 2-(1H-benzotriazole-1-yl)-1,1,3,3-tetramethylaminium
HATU: hexafluorophosphate of (dimethylamino)-N,N-dimethyl(3H-[1,2,3]triazolo[4,5-b]pyridin-3-yloxy)methaniminium,
BOP: hexafluorophosphate of benzotriazol-1-yloxytris(dimethylamino)phosphonium,
PyBOP: hexafluorophosphate of benzotriazol-1-yloxytripyrrolidinophosphonium,
HOBt: hydroxybenzotriazole,
DCC: dicyclohexylcarbodiimide
EDC: 1-ethyl-3-(3-dimethylaminopropyl)carbodiimide,
DIPEA: diisopropylethylamine,
Pd/C: palladium/carbon.

Method for the Preparation of a Compound of Formula (E)

An object of the present invention pertains to a method for the industrial preparation of ((2S)-3-([1,1'-biphenyl]-4-yl)-2-((((R)-1-aminoethyl)(hydroxy)phosphoryl)methyl) propanoyl)-L-alanine acid of following formula (E):

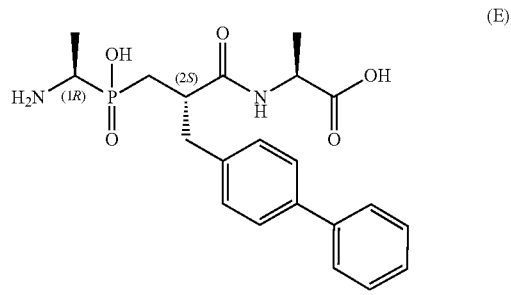 [SMILES: C[C@H](NC(=O)[C@H](Cc1ccc(-c2ccccc2)cc1)CP(=O)(O)[C@H](C)N)C(=O)O]

(E)

comprising the following steps:

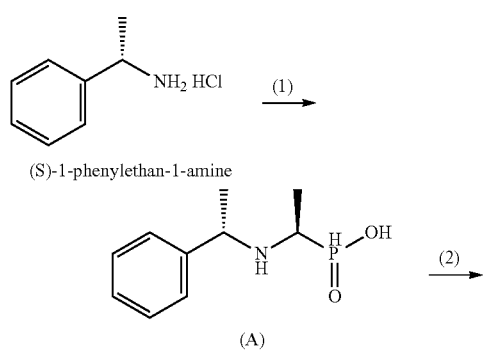

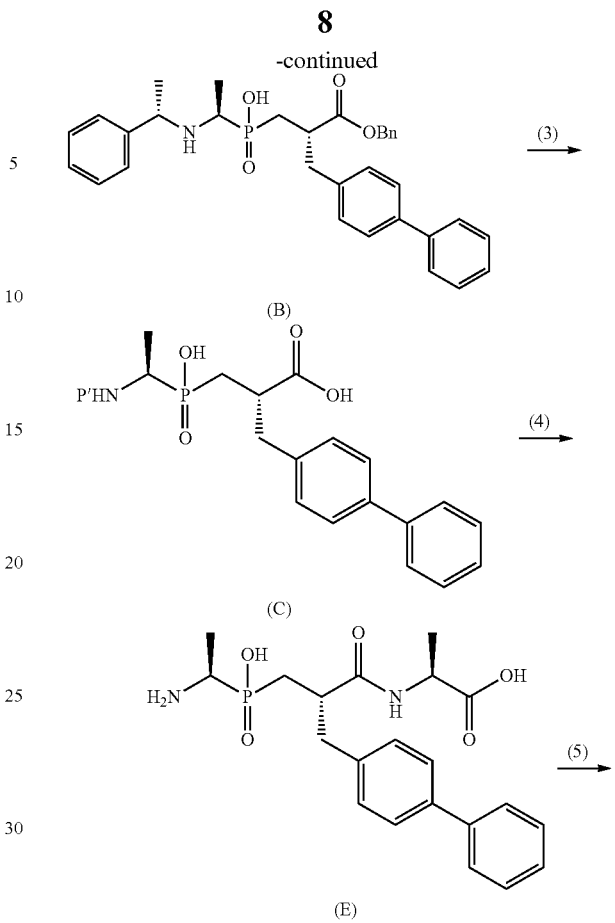

Step (1): Synthesis of compound (A) by reaction of (S)-1-phenylethylamine with a solution of hypophosphorous acid $H_3PO_2$ and acetaldehyde in the presence of a molar equivalent of concentrated hydrochloric acid then treatment with propylene oxide;

Step (2): Synthesis of the compound of formula (B) by reaction of the compound of formula (A) with the benzylic ester of (2-(4-biphenyl)methyl)acrylate;

Step (3): Synthesis of the compound of formula (C) by hydrogenolysis of the compound of formula (B) in the presence of Pd/C and protection of the resulting amine with the group P';

Step (4): Synthesis of the compound of formula (E) by peptide coupling of the compound of formula (C) with the tert-butyl ester of (L)-alanine then deprotection of the protective groups.

Step (1)

The compound of formula (A) has been cited in the publication Hamilton et al., *Tet. Lett.,* 1995, 36, 4451-4454, within a general synthesis of amino-phosphonic acids but was not described as an example in said publication. To the knowledge of the inventors, the compound of formula (A) has thus never been characterised beforehand. The authors of this publication indicate that the reaction conditions used, for this specific example, "gave a solution of dark colour from which no product could be isolated". This publication describes a hydrolysis-oxidation process in order to synthesise alpha-aminophosphonic acids and not aminophosphinic acids as in the present application. It is also indicated that the removal by hydrogenolysis of the protective group on the amine function of organophosphorous compounds could be problematic.

The inventors of the present invention have discovered in a surprising manner that the use of one equivalent of HCl during step (1a) makes it possible to avoid the degradation of the reaction mixture.

The presence of one equivalent of HCl, more or less 0.1 equivalent, is an essential parameter for the synthesis of the invention. In the absence thereof, degradation is observed.

Step (1) of the method of the present invention comprises steps (1a) to (1c) such as described above and in the following diagram.

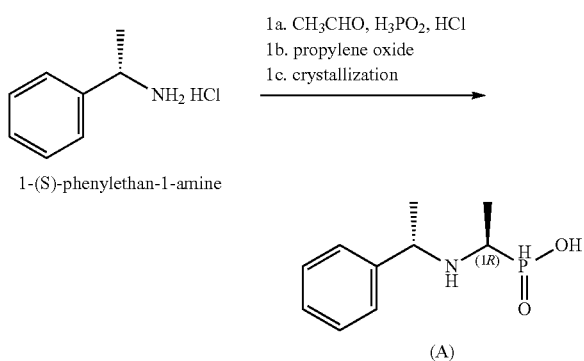

In the application WO2010/010106, the (1R)(1-benzyloxycarbonylamino-ethyl)-phosphinic) acid chiral precursor intended to react with the benzylic ester of (2-(4-biphenyl) methyl)acrylate is obtained in 4 steps via a resolution of racemic phosphinic acid in the presence of (R)(+)α-methylbenzylamine with an overall yield of 28% (see Example 1). The step of resolution by recrystallisation of the racemic compound in the presence of (R)(+)α-methylbenzylamine is notably responsible for this poor overall yield since by definition, 50% of the product corresponding to the undesired enantiomer is not recovered. In addition, transposition to the industrial scale of this type of chiral resolution does not make it possible to improve the yield.

In the present invention, the chirality is directly induced at the start of synthesis by the starting reagent, (S)-1-phenylethylamine in step (1a). The (S)-1-phenylethylamine used in the present invention is a commercially available product (for example sold by Sigma-Aldrich) having a chiral purity of at least 98%, preferably 99%. According to the present invention, a (S)-1-phenylethylamine having a chiral purity of at least 90% may also be used to introduce chirality.

(S)-1-phenylethylamine reacts with an aqueous solution of hypophosphorous acid $H_3PO_2$ and anhydrous acetaldehyde, that is to say of chemical purity greater than or equal to 99%, in the presence of a molar equivalent of hydrochloric acid with respect the quantity of (S)-1-phenylethylamine, in a polar and protic solvent.

The hydrochloric acid used in step (1a) advantageously corresponds to an aqueous solution of concentrated hydrochloric acid, which notably makes it possible to avoid dilution of the reaction mixture. Preferably, this solution is 37% by weight concentrated hydrochloric acid.

According to a preferred embodiment, the polar and protic solvent of step (1a) is selected from among alcohols such as methanol, ethanol, n-propanol, isopropanol, n-butanol, tert-butanol and mixtures thereof. Preferably, it is ethanol.

Preferably, step (1a) firstly comprises the addition of the hydrochloric acid solution, advantageously concentrated, to a solution of (S)-1-phenylethylamine in the polar and protic solvent such as defined above then secondly the addition of the solution of hypophosphorous acid to the mixture of (S)-1-phenylethylamine with hydrochloric acid, and finally, thirdly, the addition of anhydrous acetaldehyde to the mixture of (S)-1-phenylethylamine, hydrochloric acid and hypophosphorous acid.

Advantageously, the aqueous hypophosphorous acid solution is a 50% by weight solution. Advantageously, the hypophosphorous acid is added in quantities comprised between 1 and 2 equivalents, preferably between 1.1 and 1.5 equivalents, more preferably at 1.1 equivalents with respect to (S)-1-phenylethylamine.

Acetaldehyde is preferably added in quantities comprised between 1 and 2 equivalents, preferably between 1.2 and 1.5 equivalents, more preferably at 1.2 equivalents with respect to (S)-1-phenylethylamine. Typically, anhydrous acetaldehyde is used.

In an advantageous embodiment, the solution of (S)-1-phenylethylamine is at a temperature comprised between −5° C. and 5° C., preferably at 0° C., during the addition of the concentrated hydrochloric acid solution and the hypophosphorous acid solution.

The resulting reaction mixture is stirred for a sufficient time so that the conversion of (S)-1-phenylethylamine is greater than or equal to 90%. The monitoring of the reaction is notably ensured by HPLC. Preferably, this time is comprised between 1 h and 8 h, preferably between 3 h and 6 h, more preferably between 3 h and 4 h. Said stirring is advantageously carried out at the boiling temperature of the solvent used, more or less 5° C.

Step (1a) is preferably carried out under inert atmosphere, for example under nitrogen or argon atmosphere.

In step (1b), propylene oxide is added to the reaction mixture resulting from step (1a). Thus, step (1b) typically comprises the following successive steps:
  (1b.1) addition of propylene oxide to the reaction mixture derived from step (1a) and obtaining a suspension,
  (1b.2) stirring of the suspension derived from step (1b.1),
  (1b.3) recovery of a solid by filtration of the suspension derived from step (1b.2).

Propylene oxide is advantageously added in quantities comprised between 1 and 4 equivalents, preferably between 1.5 and 3 equivalents, more preferably 2 equivalents, with respect to (S)-1-phenylethylamine. This addition is preferably carried out at a temperature comprised between 0° C. and 15° C., in particular at 10° C. The resulting mixture is typically stirred for a time comprised between 5 h and 25 h, preferably, between 8 h and 18 h, in particular between 10 h and 14 h, notably at room temperature.

A solid is recovered by filtration at the end of step (1b). Said solid is next crystallised by suspension in a polar and protic solvent. Typically, it is the same solvent as that used in step (1a).

Advantageously, the crystallisation step (1c) comprises the following successive steps:
  (1c.1) dilution of the solid derived from step (1b) in a polar and protic solvent, preferentially selected from among alcohols such as methanol, ethanol, n-propanol, isopropanol, n-butanol, tert-butanol and mixtures thereof, advantageously ethanol,
  (1c.2) cooling of the mixture resulting from step (1c.1) to a temperature comprised between 10° C. and 20° C.,
  (1c.3) recovery of compound (A) after filtration and drying, notably under vacuum.

In a particular embodiment, compound (A) is directly recovered by filtration at the end of step (1b) without step (1c) being necessary.

In another embodiment, step (1c) is optionally repeated, notably once.

In another particular embodiment, the solid derived from step (1b) is washed with a polar and protic solvent then dried, notably under vacuum, to give a first fraction of the compound of formula (A). According to this embodiment, the filtrate derived from the filtration of step (1b) is concentrated, notably under vacuum, to give a moist slurry, which is itself crystallised according to steps (1c.1) to (1c.3) described above.

According to the present invention, the chiral precursor derivative of phosphinic acid intended to react with the benzylic ester of (2-(4-biphenyl)methyl)acrylate is obtained with an average yield of 38 to 40% in a reaction compared to the method described in WO2010/010106 where the chiral precursor (1R)(1-benzyloxycarbonylamino-ethyl)-phosphinic) acid intended to react with the benzylic ester of (2-(4-biphenyl)methyl)acrylate is obtained after 4 reaction steps with an overall yield of 28%.

The compound of formula (A) obtained at the end of step (1) has an optical purity (1R/1S) greater than 95/5, preferably greater than 96/4, more preferably greater than 97/3, even more preferably greater than 98/2, even more preferably greater than 99/1.

Step (2)

Step (2) of the method of the present invention comprises steps (2a) and (2b) such as described above and in the following diagram.

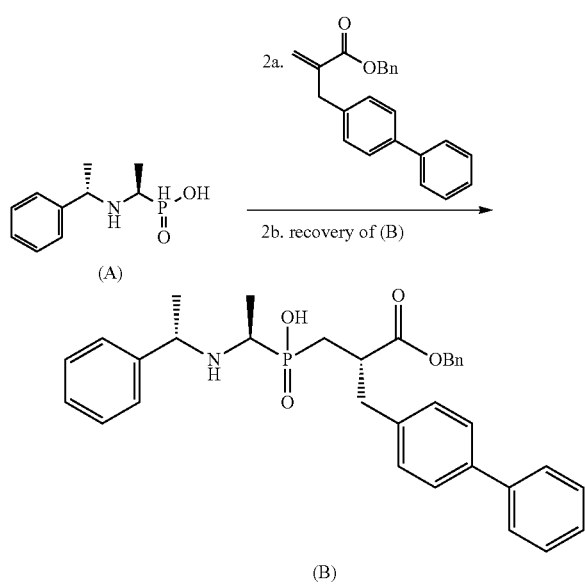

In step (2a), the compound of formula (A) derived from step (1) thus reacts with the benzylic ester of (2-(4-biphenyl) methyl)acrylate in the presence of a source of trimethylsilyl groups. Advantageously, this source of trimethylsilyl groups is selected from among N,O-bis(trimethylsilyl)acetamide (BSA), TMS chloride (TMSCl), TMS triflate (TMSOTf) and hexamethyldisilazane (HMDS), preferably it is N,O-bis (trimethylsilyl)acetamide (BSA). The source of trimethylsilyl groups makes it possible to introduce TMS groups on the secondary amine and the hydroxyl functions of the compound of formula (A) in order that the phosphorous atom is the only atom to react with the acrylate function of the benzylic ester of (2-(4-biphenyl)methyl)acrylate.

The benzylic ester of (2-(4-biphenyl)methyl)acrylate is obtained according to the method described in the application WO2010/010106 (see Example 2) which uses the protocol described in Organic Synthesis Coll. Vol. 3 p. 337.

Preferably, step (2a) firstly comprises the mixing of the compound of formula (A) with the benzylic ester of (2-(4-biphenyl)methyl)acrylate then secondly the addition of the source of trimethylsilyl groups to said mixture.

Advantageously, the source of trimethylsilyl groups is added in quantities comprised between 2 and 6 equivalents, preferably between 3 and 4.5 equivalents, more preferably 3.2 equivalents with respect to the compound of formula (A). According to the present invention, the quantity of the source of trimethylsilyl groups, typically BSA, used is thus limited, which is advantageous in terms of cost and removal of quantities of reagents not having reacted or impurities generated by such quantities, unlike the application WO2010/010106 in which BSA is used as solvent and thus in large excess.

The benzylic ester of (2-(4-biphenyl)methyl)acrylate is preferably added in quantities comprised between 1 and 2 equivalents, preferably between 1 and 1.5 equivalents, more preferably 1 equivalent with respect to the compound of formula (A).

The reaction mixture comprising the compound of formula (A), the benzylic ester of (2-(4-biphenyl)methyl)acrylate and the source of trimethylsilyl groups is stirred for a sufficient time so that the conversion of the compound of formula (A) is greater than or equal to 90%. Monitoring of the reaction is notably ensured by HPLC. Preferably, this time is comprised between 1 h and 8 h, preferably between 3 h and 6 h, more preferably between 3 h and 4 h. Said stirring is advantageously carried out at a temperature comprised between 40° C. and 120° C., preferably between 60° C. and 100° C., more preferably between 75° C. and 85° C.

Step (2a) is preferably carried out under inert atmosphere, for example under nitrogen or argon atmosphere.

The compound of formula (B) is next recovered during step (2b).

According to a first alternative of the invention, step (2b) corresponds to step (2b.1) of crystallisation. According to this alternative, step (2a) is thus advantageously directly followed by step (2b.1). In this first alternative, step (2b.2) is not carried out.

Step (2b.1) of crystallisation typically comprises the following successive steps:
  (2b.1.1) cooling of the reaction mixture derived from step (2a) to a temperature comprised between 20° C. and 40° C.,
  (2b.1.2) dilution of said reaction mixture with a mixture of apolar aprotic solvent and water and formation of a suspension,
  (2b.1.3) recovery of the compound of formula (B) by filtration of the suspension derived from step (2b.1.2) and drying, notably under vacuum.

According to this alternative, the compound of formula (B) thus crystallises in a mixture of apolar aprotic solvent and water. The apolar aprotic solvent is notably selected from among hydrocarbons, such as hexane, heptane, ethers such as diethylether, diisopropyl ether, methyl-tert-butyl-ether (MTBE) and tetrahydrofuran (THF), and mixtures thereof. In particular it is MTBE. The crystallisation solvent of step (2b.1.2) is thus preferably a MTBE/water mixture, notably in proportion 5/3.

The presence of water in the reaction mixture notably makes it possible to deprotect the TMS functions. Before the precipitation step, compound (B) in solution is not enriched or slightly enriched with diastereoisomer (1R, 2S). The ratio of the diastereoisomers on the $2^{nd}$ carbon (1R, 2S/1R, 2R) is for example of 60/40, measured by $^{13}$P NMR.

During step (2b.1.2), said reaction mixture after dilution in a mixture of apolar aprotic solvent and polar solvent is stirred for a sufficient time so that compound (B) precipitates, this time being typically comprised between 2 h and 24 h, preferably 12 h.

In the conditions described, the crystallisation of step (2b.1.2) is diastereoselective, which signifies that the desired diastereoisomer, of configuration (1R, 2S), precipitates in a majority manner compared to the diastereoisomer (1R, 2R). The compound of formula (B) obtained at the end of step (2) is thus a majority of configuration (1R, 2S).

"A majority" or "in majority manner" is taken to mean, in the sense of the present invention, that the diastereoisomer (1R, 2S) is obtained in proportions strictly greater than 50% compared to the diastereoisomer (1R, 2R).

According to a first alternative of the invention, the compound of formula (B) derived from step (2b.1) has an optical purity on the $2^{nd}$ carbon (2S/2R) greater than 95/5, preferably greater than 96/4, more preferably greater than 97/3, even more preferably greater than 98/2, even more preferably greater than 99/1.

According to the present invention, the compound of formula (B) derived from the reaction with the benzylic ester of (2-(4-biphenyl)methyl)acrylate is obtained with an average yield of 54%. Given the diastereoisomeric ratio on the $2^{nd}$ carbon (2S/2R) of the order of 60/40 obtained at the end of step (2a), the average yield of the crystallisation step (2b.1) is of the order of 90%, compared to 79% of the step of crystallisation of the compound derived from the reaction with the benzylic ester of (2-(4-biphenyl)methyl)acrylate described in the application WO 2010/010106 (see Example 3, step 1).

According to a second alternative of the invention, step (2b) corresponds to step (2b.2). Thus, step (2a) is advantageously directly followed by step (2b.2). In this second alternative, step (2b.1) is not carried out.

Step (2b.2) typically comprises the following successive steps:
(2b.2.1) evaporation of the reaction mixture derived from step (2a) and recovery of a solid,
(2b.2.2) trituration of the solid derived from step (2b.2.1) in acetone, filtration and recovery of the compound of formula (B) in the filtrate by evaporation.

Typically, the solid derived from step (2b.2.1) corresponds to the compound of so-called "raw" formula (B), that is to say having an optical purity on the $2^{nd}$ carbon (2S/2R) advantageously strictly greater than 50/50 and less than or equal to 95/5, typically comprised between 51/49 and 70/30, notably 57/43.

Step (2b.2.2) corresponds to a step of diastereoisomeric enrichment of the compound of formula (B).

According to a preferred embodiment, the trituration of step (2b.2.2) is carried out for a duration comprised between 30 min and 2 h, typically for 1 h. The temperature of said step is notably equal to room temperature.

During this trituration step, the diastereoisomer of configuration (1R, 2R) precipitates in a majority manner, and the desired diastereoisomer of configuration (1R, 2S) is recovered in a majority manner in the filtrate.

Typically, the compound of formula (B) obtained in the filtrate, at the end of step (2b.2.2), has an optical purity on the $2^{nd}$ carbon (2S/2R) comprised between 70/30 and 90/10, preferably between 80/20 and 90/10, notably 81/19.

Step 3

Step 3 of the method of the present invention comprises steps (3a) and (3b) such as described above and in the following diagram.

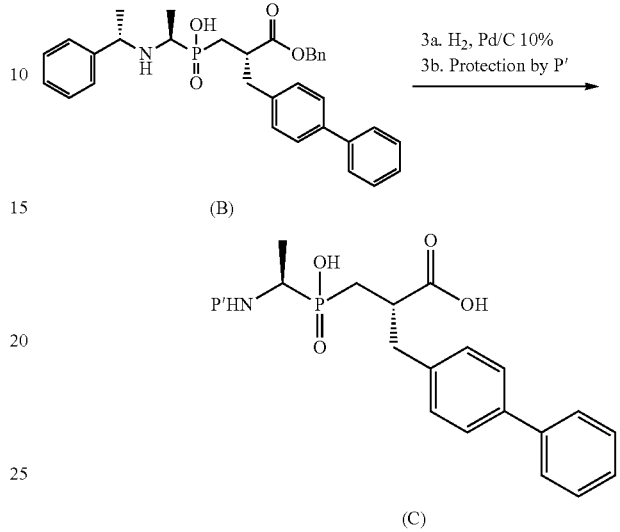

Step (3a) consists in hydrogenolysis in the presence of palladium on carbon (Pd/C) making it possible to deprotect the benzyl group and the 1-phenylethyl group present on the compound of formula (B). In the application WO2010/010106, the deprotection of the benzyl group and the carboxybenzyl group of the benzylic ester of 3-[(2-benzyloxycarbonyl-3-biphenyl-4-yl-propyl)-hydroxy-phosphinoyl] butyric acid is done by saponification in the presence of an important quantity of sodium hydroxide (see Example 3, step 2). However, this saponification is difficult to implement on the industrial scale because the quantities of benzyl alcohol generated create a three phase medium, making isolation of the reaction intermediate difficult and may generate impurities in consequent quantity.

According to the present invention, deprotection by hydrogenolysis does not generate benzylic alcohol but by-products that are easily removable, by evaporation under reduced pressure, such as toluene and ethylbenzene, and thus prove to be more suited to synthesis on the industrial scale.

The successive deprotection of the benzyl group and the 1-phenylethyl group according to the present invention is illustrated in the following diagram:

-continued

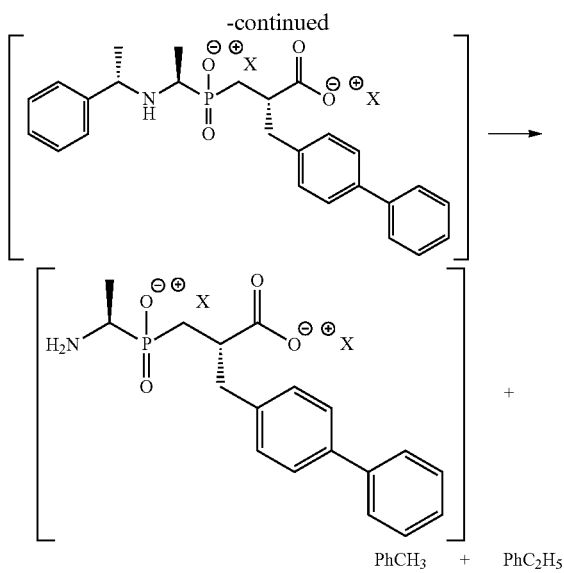

PhCH₃   +   PhC₂H₅ where $X^+$ represents a counter ion derived from the base used.

Advantageously, step (3a) comprises the following successive steps:
(3a.1) preparation of a suspension comprising the compound of formula (B) in a protic solvent or a mixture of protic solvents,
(3a.2) addition of a base to the suspension prepared at step (3a.1),
(3a.3) addition to the suspension resulting from step (3a.2) of 10% by weight of Pd/C with respect to the weight of compound of formula (B) and purge of the resulting reaction mixture with $H_2$,
(3a.4) filtration and concentration of the reaction mixture.

According to a preferred embodiment, step (3a.1) is carried out in a solvent protic selected from among water, acetic acid, alcohols such as methanol, ethanol, n-propanol, isopropanol, n-butanol, isobutanol and tert-butanol, and mixtures thereof. Preferably, it is a water/alcohol mixture, notably water/ethanol.

Advantageously, the base in step (3a.2) is selected from among triethylamine, trimethylamine, diisopropylethylamine, sodium hydroxide (NaOH), potassium hydroxide (KOH), lithium hydroxide (LiOH), barium dihydroxide (Ba(OH)₂), calcium dihydroxide (Ca(OH)₂) and cesium dihydroxide (Cs(OH)₂), preferably it is sodium hydroxide, in particular 1N sodium hydroxide.

According to a preferred embodiment, during the addition of said strong base, the suspension derived from step (3a.1) is at a temperature comprised between −10° C. and 10° C., preferably between −5° C. and 5° C., more preferably at 0° C.

The strong base is advantageously added to the suspension derived from step (3a.1) in quantities comprised between 1 and 2 equivalents, preferably between 1 and 1.5 equivalents, more preferably 1 equivalent with respect to the compound of formula (B).

The mixture resulting from step (3a.2) is typically stirred at room temperature for a sufficient duration to observe complete solubilisation, notably for a time comprised between 1 hour and 5 hours.

After the addition of Pd/C to the reaction mixture, said mixture is advantageously purged with nitrogen or argon before being purged with $H_2$.

According to an embodiment, the reaction mixture resulting from step (3a.3) is stirred for a time comprised between 15 h and 30 h, preferably between 18 h and 25 h, more preferably for 18 h, at a temperature comprised between 15° C. and 40° C., preferably between 20° C. and 30° C. This stirring is carried out typically under a pressure of 1 bar of $H_2$.

In a particular embodiment, the stirring of the reaction mixture resulting from step (3a.3) is stopped after a sufficient time to deprotect the benzyl group but before deprotection of the phenylethyl group takes place. In this case, the amine function remains protected by the phenylethyl group and step (3b) is not necessary.

During step (3a.4), the reaction mixture is filtered to remove Pd/C. The filtrate is next concentrated, for example under vacuum, to remove a part of the solvent, notably the alcohol.

It is described in the literature, such as for example in the publication of Baylis et al, *J. Chem. Soc.*, Perkin trans. 11984, p. 2846-2853, that phosphinic acid is a Pd catalyst poison. That is why it is then necessary to use large quantities of Pd/C, as described in WO2010/010106 for the synthesis of Example 4 (PL265), where 50% by weight of 10% Pd/C are used. These large quantities sometimes lead to hydrogenation of the P—C bond. In the case of the present invention, for the synthesis of the compound of formula (C), control of the basic pH using a base such as described above for step (3a.2), enables the use of only 10% by weight of Pd/C.

Step (3b) consists in the protection of the primary amine function present on the reaction intermediate derived from step (3a) using a protective group noted P'. This protection is done according to methods well known to those skilled in the art.

According to a preferred embodiment, the protection step (3b) is carried out in basic medium, preferably by addition of a strong base such as NaOH, LiOH, KOH, Ba(OH)₂, Ca(OH)₂ or CsOH. In particular, the pH of the reaction is comprised between 10 and 11. A too acid pH may lead to the formation of polar impurities and a pH above 11 can degrade the reagent making it possible to introduce the protective group P'.

Advantageously, the group P' is selected from among groups constituted of benzyloxycarbonyl (CBz) and tert-butoxycarbonyl (Boc) groups, leading respectively to the compounds of following formulas (C-a) and (C-b):

(C-a)

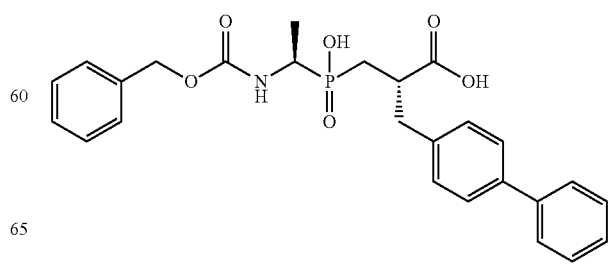

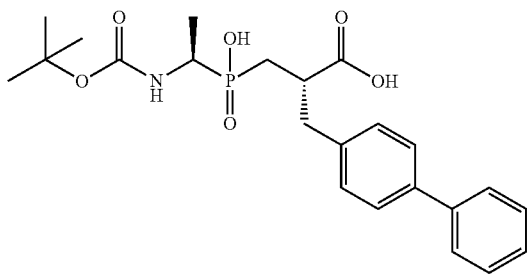

(C-b)

The CBz group is notably introduced on the compound of formula (B) using the corresponding chloride CBzCl. The Boc group is notably introduced on the compound of formula (B) using the anhydride Boc$_2$O.

According to the present invention, the compound of formula (C) is obtained with a yield comprised between 50% and 85%. In particular, the compound of formula (C-a) is obtained with an average yield of 73% and the compound of formula (C-b) is obtained with an average yield of 84%.

According to the first alternative of the invention such as described above, that is to say according to which steps (3a) and (3b) such as described above are carried out while using in step (3a) a compound of formula (B) obtained following step (2b.1) and having an optical purity (2S/2R) greater than 95/5. According to this first alternative, the compound of formula (C) of configuration (1R, 2S) obtained directly following step (3b) has an optical purity on the 2$^{nd}$ carbon (2S/2R) greater than 95/5, preferably greater than 96/4, more preferably greater than 97/3, even more preferably greater than 98/2, even more preferably greater than 99/1.

According to this first alternative of the present invention, the compound of formula (C) is notably obtained with a yield comprised between 70% and 85%. In particular, the compound of formula (C-a) is obtained with an average yield of 73% and the compound of formula (C-b) is obtained with an average yield of 84%.

According to this first alternative, the compound of formula (C) is recovered at the end of step (3b) and directly used in the following step (4) without purification and without other intermediate step.

According to a second alternative of the invention, steps (3a) and (3b) such as described above are carried out while using in step (3a) a compound of formula (B), obtained at the end of step (2b.2) and having an optical purity on the 2$^{nd}$ carbon (2S/2R) strictly greater than 50/50 and below 95/5, typically comprised between 70/30 and 90/10, notably 81/19.

According to this second alternative, an additional step of diastereoisomeric enrichment of the compound of formula (C) is carried out following step (3b). Thus, the method of the invention may comprise, directly following step (3b), the following additional step (3c):

(3c) the compound of formula (C) is triturated in a water/MTBE mixture then filtered and dried.

According to a preferred embodiment, the trituration of step (3c) is carried out for a duration comprised between 30 min and 2 h, typically for 1 h. The temperature of said step is notably equal to room temperature.

The proportions by volume of the water/MTBE mixture during step (3c) are typically comprised between 1/5 and 1/1, preferably 3/5.

Typically, according to the second alternative of the invention, the compound of formula (C) obtained at the end of step (3c) has an optical purity on the 2$^{nd}$ carbon (2S/2R) comprised between 80/20 and 99/1, preferably between 90/10 and 95/5, notably 93/7. According to this second alternative of the present invention, the compound of formula (C) is obtained with a yield of the order of 53%.

Step 4

Step 4 of the method of the present invention comprises steps (4a) and (4b) such as described above and in the following diagram.

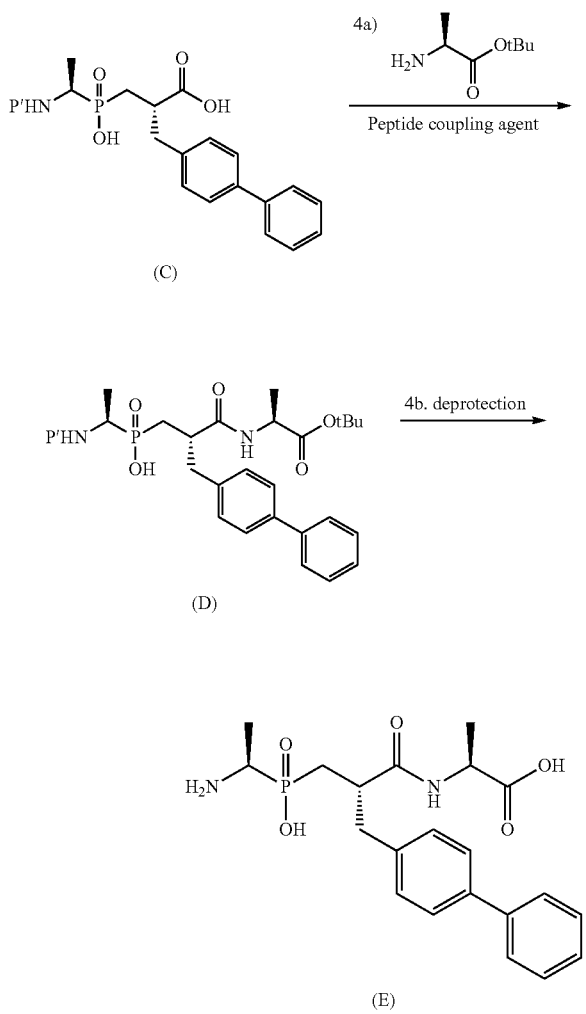

Advantageously, step (4a) comprises the following successive steps:

(4a.1) addition of the tert-butyl ester of (L)-alanine and a peptide coupling agent to a solution comprising the compound of formula (C) dissolved in DMF or in a THF/DMF mixture, (4a.2) addition of a base to the reaction mixture resulting from step (4a.1), (4a.3) recovery of the compound of following formula (D):

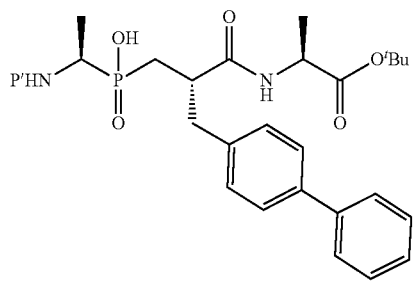

(D)

in which P' is such as defined above or corresponds to a phenylethyl group.

The peptide coupling agent introduced at step (4a.1) is typically selected from among TBTU, HATU, EDC, HOBt, BOP, PyBOP, DCC and combinations thereof.

Step (4a.1) is preferably carried out at room temperature. When a THF/DMF mixture is used during step (4a.1), it is preferably a 1/1 by volume mixture.

The base introduced at step (4a.2) is preferably selected from among triethylamine, diisopropylethylamine (DIPEA) and 2,2,6,6-tetramethylpiperidine, preferably it is DIPEA.

According to a preferred embodiment, the reaction mixture derived from step (4a.1) is at a temperature comprised between 0° C. and 15° C., preferably between 5° C. and 10° C., during the addition of the base at step (4a.2). Said temperature is maintained during the addition of the base which is generally exothermic According to an advantageous embodiment, the reaction mixture resulting from step (4a.2) is stirred for a sufficient time so that the conversion of the compound of formula (C) is greater than or equal to 95%. Monitoring of the reaction is notably ensured by HPLC. Preferably, this time is comprised between 30 min and 2 h, preferably between 30 min and 1 h, more preferably for 45 min, at a temperature comprised between 0° C. and 15° C., preferably between 5° C. and 10° C.

The compound of formula (D) is recovered following operations of acidic-basic washings, extraction in organic phase and filtration well known to those skilled in the art.

In a preferred manner, the compound of formula (D) corresponds to the following compounds (D-a) and (D-b):

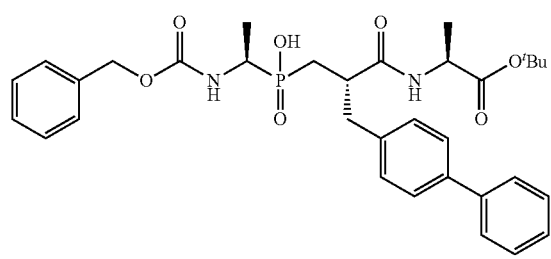

(D-a)

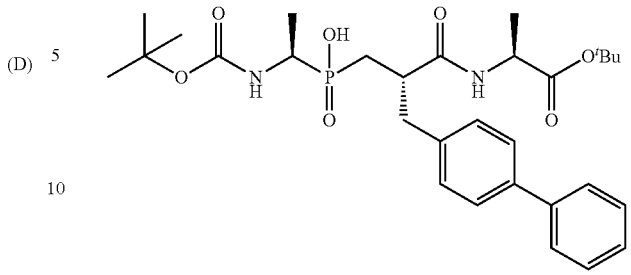

(D-b)

The compound of formula (D) is obtained with a yield comprised between 60% and 90%.

Step (4b) of deprotection of the group P' is preferably carried out under inert atmosphere, for example under nitrogen or argon atmosphere.

In a particular embodiment, when P' is a CBz group, step (4b) comprises the following successive steps:

(4b.1) reaction of compound (D-a) of following formula:

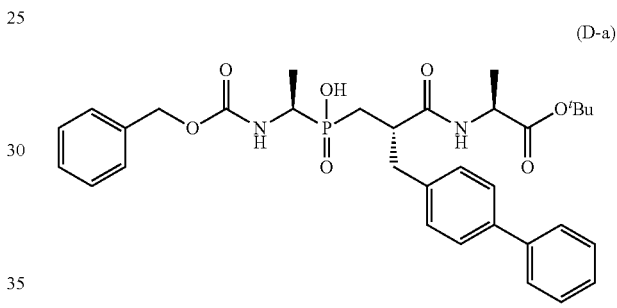

(D-a)

with HBr in acetic acid, then (4b.2) precipitation using a solvent selected from among ethyl acetate, isopropyl acetate, ethers and mixtures thereof, and recovery of the compound of formula (E) by filtration.

In a preferred manner, step (4b.1) comprises the following successive steps:
(4b.1.1) mixing the compound of formula (D-a) with acetic acid,
(4b.1.2) addition of hydrobromic acid in the form of a solution of HBr in acetic acid,
(4b.1.3) stirring the resulting mixture for a sufficient time so that the conversion of the compound of formula (D-a) is greater than or equal to 95%.

Hydrobromic acid HBr is preferably added in quantities comprised between 6 and 10 equivalents, preferably between 6 and 8 equivalents, more preferably 6 equivalents with respect to compound (D-a). A quantity of hydrobromic acid greater than 10 equivalents leads to partial racemisation of the product, during concentration. A minimum of 6 equivalents is necessary so that deprotection is total. By comparison, the similar step of deprotection using HBr in acetic acid in the application WO2010/010106 (see Example 3, step 2) used 28 equivalents of HBr. The quantities used in the present invention notably enable easier removal of the remaining acid, notably by evaporation.

In a preferred embodiment, the mixture resulting from step (4b.1.1) is at a temperature comprised between 5° C. and 20° C., preferably between 10° C. and 15° C. during the addition of hydrobromic acid. The temperature is maintained below 20° C., preferably between 15° C. and 20° C. during the addition of HBr and during step (4b.1.3). A temperature greater than 20° C. would lead to partial racemisation of the resulting product.

The reaction mixture resulting from step (4b.1.2) is stirred for a sufficient time so that the conversion of (S)-1-phenylethylamine is greater than or equal to 95%. Monitoring of the reaction is notably ensured by HPLC. Preferably, this time is comprised between 2 h and 8 h, preferably between 3 h and 6 h, more preferably between 5 h and 6 h.

The ethers in step (4b.2) are preferably selected from among diisopropyl ether, tetrahydrofuran, methyl-tert-butyl ether, dioxane, diethylether, petroleum ether and mixtures thereof.

Preferably, the solvent of step (4b.2) corresponds to diisopropyl ether.

In another particular embodiment, when P' is a Boc group, step (4b) comprises the following successive steps:

(4b.1') reaction of compound (D-b) of following formula:

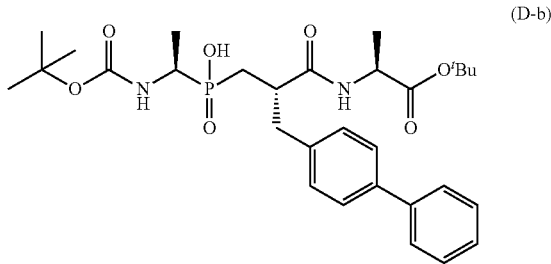 [SMILES: C[C@H](NC(=O)[C@H](Cc1ccc(-c2ccccc2)cc1)CP(=O)(O)[C@H](C)NC(=O)OC(C)(C)C)C(=O)OC(C)(C)C]

with formic acid to lead to an oil, (4b.2') trituration of the oil resulting from step (4b.1') in an apolar aprotic solvent and recovery of the compound of formula (E) by filtration.

In a preferred manner, step (4b.1') comprises the following successive steps:

(4b.1'0.1) mixing the compound of formula (D-b) with formic acid, (4b.1'0.2) stirring the resulting solution for a time comprised between 1 h and 4 h, preferably for 2 h, at a temperature comprised between 40° C. and 60° C., preferably at 50° C., (4b.1'0.3) concentrating the solution, notably under vacuum, until an oil is obtained.

In step (4b.1'0.1), formic acid is preferably added in proportions comprised between 20 and 40 equivalents, preferably between 20 and 30 equivalents, more preferably 26 equivalents with respect to the compound of formula (D-b). The formic acid used is typically an aqueous solution of 88% by volume formic acid.

Formic acid has the advantage of being not very acidic and not very corrosive and may be removed easily, it is thus particularly suited to synthesis on the industrial scale.

In an advantageous manner, the apolar aprotic solvent of step (4b.2') is selected from among hexane, heptane, diisopropyl ether, MTBE and mixtures thereof, preferably it is MTBE.

The compound of formula (E) is typically obtained with a yield comprised between 90% and 95%.

According to the first alternative of the invention such as described above, involving the carrying out of step (2b.1), in which steps (2b.2) and (3c) are not carried out, and according to which steps (4a) and (4b) such as described above are carried out while using in step (4a) the compound of formula (C) derived from step (3b) and having an optical purity on the $2^{nd}$ carbon (2S/2R) greater than 95/5, preferably greater than 96/4, more preferably greater than 97/3, even more preferably greater than 98/2, even more preferably greater than 99/1. According to this first alternative, the compound of formula (D) of configuration (1R, 2S, L-Ala) has an optical purity on the $2^{nd}$ carbon (2S/2R) greater than 95/5, preferably greater than 96/4, more preferably greater than 97/3, even more preferably greater than 98/2, even more preferably greater than 99/1, and the compound of formula (E) of configuration (1R, 2S, L-Ala) also has an optical purity on the $2^{nd}$ carbon (2S/2R) greater than 95/5, preferably greater than 96/4, more preferably greater than 97/3, even more preferably greater than 98/2, even more preferably greater than 99/1.

According to a second alternative of the invention such as described above, involving the carrying out of step (2b.2) and the additional step (3c), in which step (2b.1) is thus not carried out, and where steps (4a) and (4b) such as described above are carried out while using in step (4a) a compound of formula (C) derived from step (3c) and having an optical purity on the $2^{nd}$ carbon (2S/2R) strictly greater than 50/50 and less than or equal to 95/5, preferably comprised between 90/10 and 95/5, notably 93/7. According to this first alternative, the compound of formula (D) of configuration (1R, 2S, L-Ala) has an optical purity comprised between 80/20 and 99/1, preferably between 90/10 and 95/5.

According to this second alternative, an additional step of diastereoisomeric enrichment of the compound of formula (E) is carried out following step (4b). Thus, the method of the invention may comprise, directly following step (4b), the following additional step (4c):

(4c) the compound of formula (E) is triturated in dichloromethane.

According to a preferred embodiment, the trituration of step (4c) is carried out for a duration comprised between 30 min and 2 h, typically for 1 h. The temperature of said step is notably equal to room temperature.

Typically, the compound of formula (E) obtained at the end of step (4c) has an optical purity on the $2^{nd}$ carbon (2S/2R) comprised between 90/10 and 99/1, notably 94/6.

Method for the Preparation of a Compound of Formula (I)

Another object of the present invention relates to a method for the industrial preparation of the disodium salt of ((2S)-3-([1,1'-biphenyl]-4-yl)-2-((hydroxy((1R)-1-(((1-isobutyryloxy)ethoxy) carbonyl)amino)ethyl)phosphoryl) methyl)propanoyl)-L-alanine of following formula (I):

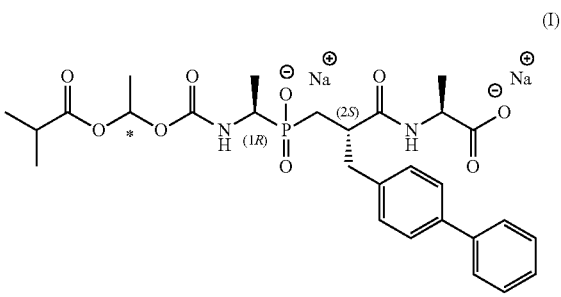 [SMILES: CC(OC(=O)N[C@@H](C)P(=O)([O-])C[C@@H](Cc1ccc(-c2ccccc2)cc1)C(=O)N[C@@H](C)C(=O)[O-])OC(=O)C(C)C ; [Na+] ; [Na+]]

comprising the following steps:

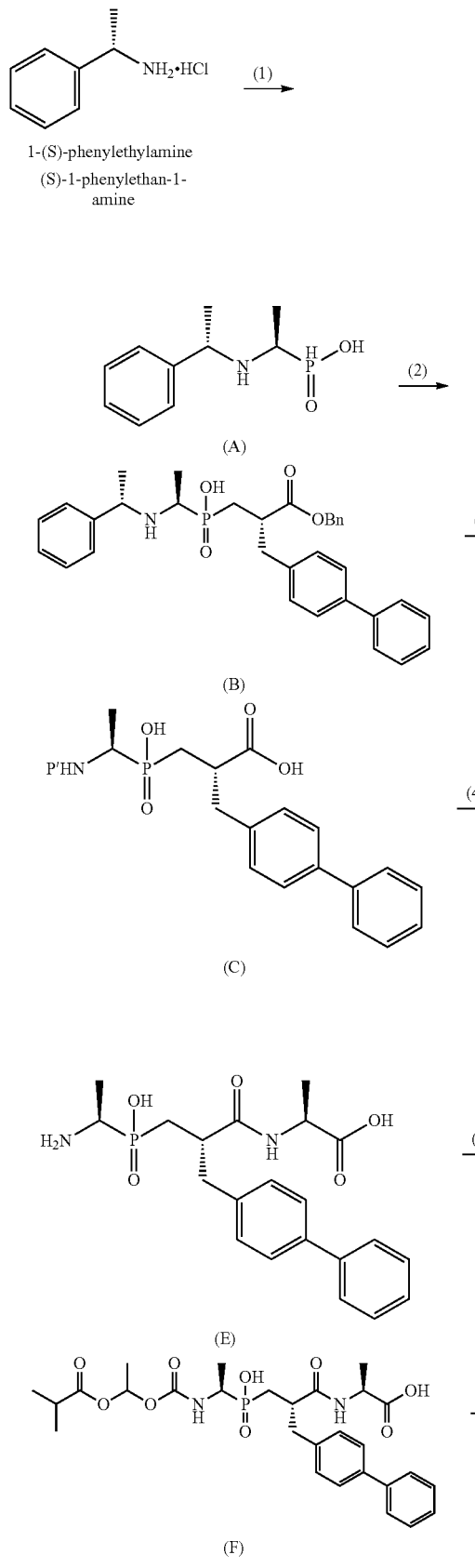

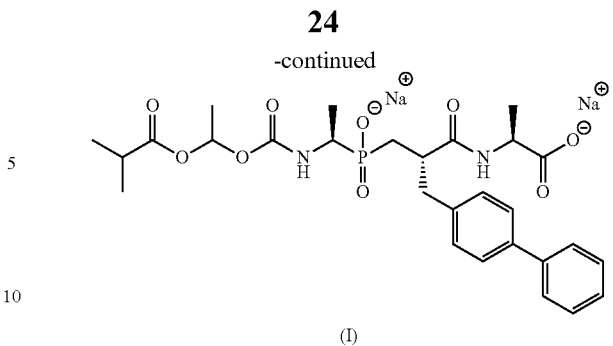

(I)

Steps (1) to (4): such as described previously,
Step (5): Synthesis of the compound of formula (F) by reaction of the compound of formula (E) with acyloxyalkyl N-hydroxysuccinimide in the presence of a base;
Step (6): Recovery of the compound of formula (I) by precipitation in an apolar aprotic solvent in the presence of a sodium salt of a weak base.

The method for the industrial preparation of the compound of formula (I) thus comprises the successive steps (1) to (4) such as defined above, according to one or the other of the first and second alternatives described above, and, directly following step (4), steps (5) and (6), reported in detail hereafter.

Step 5

Step 5 according to the present invention comprises the reaction of the compound of formula (E) with acyloxyalkyl N-hydroxysuccinimide in the presence of a base to lead to the compound of formula (F) such as described in the following diagram:

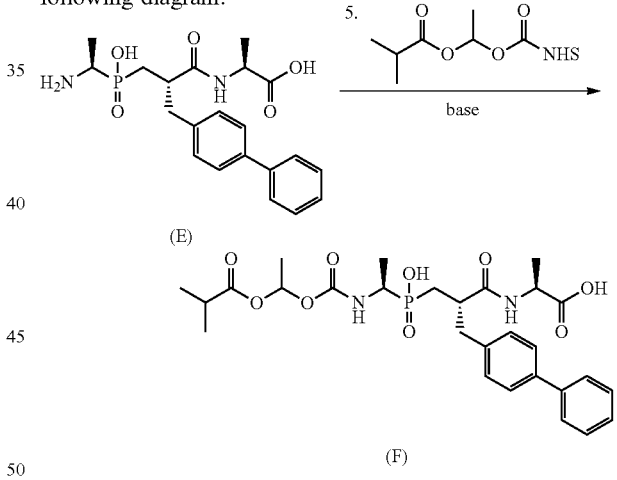

Step (5) advantageously comprises the following successive steps:
(5a) reaction of the compound of formula (E) with acyloxyalkyl N-hydroxysuccinimide in the presence of a base in a polar aprotic solvent,
(5b) crystallisation using a aprotic apolar solvent and recovery of the compound of formula (F) by filtration.

In a preferred manner, step (5a) comprises the following successive steps:
(5a.1) dissolution of the compound of formula (E) in a polar aprotic solvent,
(5a.2) addition of acyloxyalkyl N-hydroxysuccinimide to the solution resulting from step (5a.1),
(5a.3) addition of the base to the solution resulting from step (5a.2).

The reaction of the compound of formula (E) with acyloxyalkyl N-hydroxysuccinimide (CAS 860035-3-10-5) generates N-hydroxysuccinimide as by-product, easily removed by aqueous washing. The introduction of the acyloxyalkyl group does not necessitate purification by silica column, little suited to synthesis on the industrial scale, unlike the synthesis described in the application WO2010/010106 which generates 4-nitrophenol and thus necessitates purification on silica gel.

In step (5a.1), the dissolution of the compound of formula (E) is preferably carried out at room temperature.

The polar aprotic solvent is notably selected from among DMF, DMSO, acetone and ethyl acetate, preferably it is DMF.

Advantageously, acyloxyalkyl N-hydroxysuccinimide is added to the solution resulting from step (5a.1) in quantities comprised between 1 and 2 equivalents, preferably between 1 and 1.5 equivalents, more preferably 1 equivalent with respect to the compound of formula (E).

Preferably, the solution resulting from step (5a.1) is at a temperature comprised between 0° C. and 15° C., preferably between 5° C. and 10° C. during the addition of acyloxyalkyl N-hydroxysuccinimide.

The base introduced during step (5a.3) is notably selected from among triethylamine, diisopropylethylamine (DIPEA) and 2,2,6,6-tetramethylpiperidine, in particular triethylamine.

The temperature of the reaction mixture is maintained at a temperature below 15° C. preferably between 10° C. and 15° C. during the addition of the base.

Preferably, the base is added to the solution resulting from step (5a.2) in quantities comprised between 1 and 4 equivalents, preferably between 2 and 3 equivalents, notably between 2 and 2.5 equivalents, compared to the compound of formula (E).

The reaction mixture resulting from step (5a.3) is stirred for a sufficient time so that the conversion of the compound of formula (F) is greater than or equal to 95%. Monitoring of the reaction is notably ensured by HPLC. Preferably, this time is comprised between 1 h and 8 h, preferably between 4 h and 6 h, more preferably between 4 h and 5 h. Said stirring is advantageously carried out at a temperature comprised between 10° C. and 20° C., preferably between 15° C. and 20° C.

Operations of acidic-basic washings, notably acidic, and extraction in organic phase well known to those skilled in the art may be carried out between steps (5a) and (5b).

The apolar aprotic solvent used for the crystallisation in step (5b) is typically selected from among hydrocarbons, such as hexane, heptane, ethers such as diethylether, diisopropyl ether, methyl-tert-butyl-ether (MTBE) and tetrahydrofuran (THF) and mixtures thereof. In particular, it is diisopropyl ether.

Typically, the crystallisation is carried out at room temperature.

In a particularly advantageous manner, prior to step (5b), a polar aprotic solvent such as DMF, DMSO, acetone, ethyl acetate, isopropyl acetate and mixtures thereof, preferably ethyl acetate or isopropyl acetate, in particular isopropyl acetate, is added to the mixture resulting from step (5b) which makes it possible to initiate the crystallisation. According to this embodiment, after stirring of the reaction mixture for a period comprised between 30 min and one hour, preferably 30 min, typically at room temperature, said polar aprotic solvent is removed to 80%, more or less 5%, for example by concentration under vacuum, and the resulting residue is mixed with the apolar aprotic crystallisation solvent such as defined above.

The compound of formula (F) of configuration (1R, 2S, L-Ala) advantageously has an optical purity on the $2^{nd}$ carbon (2S/2R) greater than or equal to 95/5, preferably greater than 96/4, more preferably greater than 97/3, even more preferably greater than 98/2, even more preferably greater than 99/1.

The compound of formula (F) is typically obtained with an average yield of 89%.

Step (6)

Step (6) corresponds to the salification by sodium of the compound of formula (F) to lead to the disodium salt of formula (I).

The sodium salt of a weak base has the mission of ionising the hydroxyl functions and of providing sodium counter ions to obtain the salt of formula (I). The sodium salt of a weak base is preferably sodium bicarbonate.

Advantageously, the sodium salt of a weak base is added in quantities comprised between 2 more or less 0.2 equivalents, with respect to the compound of formula (F).

According to a preferred embodiment, step (6) comprises the following successive steps:
(6a) dissolution of the compound of formula (F) in a solvent miscible with water and having a low boiling point such as ethers, in particular THF or dioxane, preferably THF,
(6b) addition of water and a sodium salt of a weak base to the solution resulting from step (6a),
(6c) elimination of the solvent of step (6a), notably by concentration under vacuum,
(6d) addition of an apolar aprotic solvent, useful for making the compound of formula (I) precipitate,
(6e) recovery of the compound of formula (I) by filtration and drying.

The mixture resulting from step (6b) is notably stirred for a period of time comprised between 15 min and one hour, preferably this time is 30 min. When sodium bicarbonate is used as sodium ions source, said mixture is stirred for a sufficient time so that the gaseous release caused by the addition of sodium bicarbonate disappears. This gaseous release is caused by the formation of $CO_2$ during the reaction of $NaHCO_3$ with the compound of formula (F).

Preferably, following step (6c) and before step (6d), several operations of addition-removal of THF are carried out, in order to remove water by azeotropic distillation.

Preferably, the apolar aprotic solvent of step (6d) is selected from among ethers, in particular from among diisopropyl ether and diethyl ether. More preferably, it is diisopropyl ether.

In a preferred manner, step (6d) is carried out in two stages. Firstly, ¼ of the volume of said apolar aprotic solvent is added to the residue resulting from step (6c) then the resulting mixture is concentrated, notably under vacuum, to remove the organic phase. Secondly, the remaining % of the volume of said apolar aprotic solvent are added to the residue resulting from the first concentration. The resulting suspension is typically stirred for a time comprised between 30 min and 2 h, preferably 1 h, in particular at room temperature before being filtered.

The compound of formula (I) of configuration (1R, 2S, L-Ala) advantageously has an optical purity on the $2^{nd}$ carbon (2S/2R) greater than or equal to 95/5, preferably greater than 96/4, more preferably greater than 97/3, even more preferably greater than 98/2, even more preferably greater than 99/1.

The compound of formula (I) is typically obtained with an average yield of step (6) of 91%.

According to the present invention, the compound of formula (I) is thus obtained by precipitation in an aprotic apolar solvent rather than by lyophilisation as described in WO2010/010106, lyophilisation being little suited to synthesis on the industrial scale.

Method for Diastereoisomeric Enrichment

The present invention also pertains to a method for diastereoisomeric enrichment of the intermediates of the method for the industrial preparation of the compound of formula (E) of the present invention.

Said diastereoisomeric enrichment method consists in carrying out a diastereoisomeric enrichment of each of the compounds of formulas (B), (C) and (E) when these have an optical purity on the $2^{nd}$ carbon (2S/2R) less than or equal to 95/5. To do so, a trituration step in a suitable solvent is carried out at each of steps (2), (3) and (4) such as described above when the compounds of formulas (B), (C) and (E) have an optical purity on the $2^{nd}$ carbon (2S/2R) less than or equal to 95/5.

Thus, the method for the preparation of the compound of formula (E) involving a method for diastereoisomeric enrichment according to the present invention is carried out from a so-called "raw" compound of formula (B) such as described above, corresponding to the solid derived from step (2b.2.1) described above and having an optical purity on the $2^{nd}$ carbon (2S/2R) strictly greater than 50/50 and less than or equal to 95/5, typically between 51/49 and 60/40, notably 57/43, the method for the preparation of the compound of formula (E) involving a diastereoisomeric enrichment method comprises the following steps:

- (2b.2.2) trituration of the solid derived from step (2b.2.1) in acetone, filtration and recovery of the compound of formula (B) in the filtrate by evaporation.
- (3c) following step (3b) such as described above, trituration of the compound of formula (C) in a water/MTBE mixture then filtration and drying,
- (4c) following step (4b) such as described above, trituration of the compound of formula (E) in dichloromethane, then filtration and drying.

Typically, the compound of formula (B) obtained at the end of step (2b.2.2) has an optical purity on the $2^{nd}$ carbon (2S/2R) comprised between 70/30 and 90/10, preferably between 80/20 and 90/10, notably 81/19.

Typically, the compound of formula (C) obtained at the end of step (3c) has an optical purity on the $2^{nd}$ carbon (2S/2R) comprised between 80/20 and 99/1, preferably between 90/10 and 95/5, notably 93/7.

Typically, the compound of formula (E) obtained at the end of step (4c) has an optical purity on the $2^{nd}$ carbon (2S/2R) comprised between 90/10 and 99/1, notably 94/6.

According to a preferred embodiment, the triturations of steps (2c), (3c) and (4c) are carried out for a duration comprised between 30 min and 2 h, typically for 1 h. The temperature of said steps is notably equal to room temperature.

In the method for the preparation of the compound of formula (E) involving a diastereoisomeric enrichment method according to the present invention, step (2b.1) such as described above is not carried out and is replaced by step (2b.2).

These trituration steps (2b.2.2), (3c) and (4c) are not carried out when compounds (B), (C) and (D) are obtained with an optical purity on the $2^{nd}$ carbon (2S/2R) greater than 95/5 at the end of the respective steps (2b), (3b) and (4b).

Compound of Formula (B)

The present invention also relates to the compound of following formula (B), of configuration (1R, 2S):

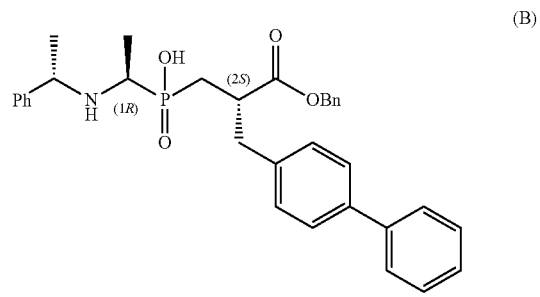 [SMILES: C[C@H](N[C@@H](C)P(=O)(O)C[C@@H](Cc1ccc(-c2ccccc2)cc1)C(=O)OCc1ccccc1)c1ccccc1]

EXAMPLES

The following examples make it possible to illustrate the invention without however limiting it.

The following abbreviations have been used:
TLC Thin Layer Chromatography
HPLC High Performance Liquid Chromatography
DMSO Dimethyl Sulphoxide
eq. Equivalent
ESI Electrospray Ionisation
min Minutes
NMR Nuclear Magnetic Resonance
TFA Trifluoroacetic Acid

[1R-[(1S-phenylethyl)amino]ethyl-phosphinic acid (compound A)

Concentrated HCl (8.14 g; 1 equiv) then a 50% aqueous $H_3PO_2$ solution (12.1 g; 1.1 equiv) are added successively to a solution cooled in ice of (S)-1-phenylethylamine (10 g; 82.5 mmol) in EtOH (40 mL, 4 volumes). After a purge with $N_2$, anhydrous acetaldehyde (4.36 g; 1.2 equiv) is added. The mixture is heated to reflux at 80° C. After 3 h, the mixture is analysed by HPLC: if the conversion of the amine into compound (A) is below 90% then 0.2 equivalents of acetaldehyde are added and the mixture is again taken to reflux for 1 h. The solution is next cooled to 10° C., treated by propylene oxide (9.57 g; 2 equiv) and is left to return to room temperature.

The suspension is stirred overnight at 20° C. then is filtered. The solid is washed with EtOH (5 mL; 0.5 vol) then is dried under vacuum to give a white solid ($1^{st}$ grade, yield: 20.5%; 1R/1S=98/2). The filtrate is diluted with iBuOAc (10 volumes to form an azeotrope with water), then is concentrated into a thick white slurry, diluted with EtOH (4 volumes), is stirred at 20° C. for 1 hour. The $2^{nd}$ grade is filtered, washed with EtOH (5 mL; 0.5 volume) then dried to give a white solid (yield: 17.8%, 1R/1S=92/8), which gives an overall yield of 38-40% and an optical purity (1R/1S) >95/5.

NMR (DMSO D6+TFA), $^1H$ (400 MHz): 1.27 (dd, 3H, $CH_3$); 1.57 (d, 3H, $NCHCH_3$); 3.06 (m, 1H); 4.72 (m, 1H, NCH); 6.33 and 7.72 (2s, 1H, PH); 7.44 (m, 3H, arom) and 7.55 (m, 2H, arom). $^{31}P$ 19.91 (0.02 P); 20.89 (0.98 P).

[(1 S)-1-[[(1R)-1-[[(2S)-3-benzyloxy-3-oxo-2-[(4-phenylphenyl)methyl]propyl]-hydroxy-phosphoryl]ethyl]amino]ethyl] Compound (B)

N,O-Bis(trimethylsilyl)acetamide (BSA) (10.67 g; 3.2 equivalents) are added to compound (A) (3.5 g; 16.4 mmol; 1 equivalent) and to the benzylic ester of (2-(4-biphenyl)methyl)acrylate (5.38 g; 1 equivalent) in a reactor purged with $N_2$. The thick suspension is heated from 40° C. (minimum stirring capacity) to 80° C. (complete solubilisation at 75° C.) then stirred for 3 hours. The solution is analysed by HPLC (conversion >90/10), then cooled to 20-40° C. and diluted with MTBE (20 volumes) and $H_2O$ (3.5 mL; 12 equivalents, exothermic reaction). A suspension forms in several hours. This was stirred for a minimum of 2 to 3 hours (overnight preferably, slow precipitation). The suspension is filtered and dried to give a white solid of configuration (1R, 2S) (5.11 g; Yield: 54%; (2S/2R=96/4).

NMR (DMSO D6+TFA)$^1$H (400 MHz): d 1.24 (dd, 3H, C(2)$CH_3$); 1.54 (d, 3H, NCH$CH_3$); 1.91 and 2.18 (2 m, 2H, C(4)$H_2$); 2.89 (m, 1H, C(2)H); 3.0 (m, 2H, C(5)$CH_2$); 3.09 (m, 1H, C(5)H); 4.71 (m,1H, NCH); 5.0 (m, 2H, O$CH_2$Bn); 7.15-7.66 (m, 19H, arom). $^{31}$P 39.61 (0.96 P; 2S diastereoisomer) and 39.87 (0.04 P; 2R diastereoisomer).

(2S)-2-[[[(1R)-1-(benzyloxycarbonylamino)ethyl]-hydroxy-phosphoryl]methyl]-3-(4-phenylphenyl)propanoic acid (Compound C-a)

1N NaOH (2.77 mL; 1 equivalent) was added to a suspension of compound (B) (1.5 g; 2.77 mmol) in EtOH (22.5 mL; 15 volumes) and $H_2O$ (18 mL; 12 volumes) cooled in an ice bath (the pH is monitored for information purposes, <11). The mixture was stirred at room temperature up to complete solubilisation. 10% Pd/C (0.15 g; 10% by weight with respect to compound (B) and 50% humid) was added. The reaction mixture was purged with $N_2$ then $H_2$ (3 cycles vac/$N_2$ then 3 cycles vac/$H_2$) and stirred for 18 h at 20-30° C., under 1 bar of $H_2$. The pH is recorded for information (pH of the order 7-8). The reaction mixture is filtered on 0.45 μm then partially concentrated to remove EtOH. 1N NaOH (2.77 mL; 1 equiv, pH>10) then CbzCl (0.472 g; 1 equiv) then 1N NaOH (2.77 mL; 1 equiv) are added and the mixture is stirred for 2 h at room temperature. The reaction is quantitative by HPLC, the compound after acidic-basic washing is used as such for the following step (0.975 g; yield: 73%; (2S/2R)=95/5).

NMR (DMSO D6+TFA)$^1$H (400 MHz) d 1.21 (dd, 3H, C(2)-$CH_3$), 1.75 and 1.98 (2 m, 1H+1H, C(4)$H_2$); 2.89-3.02 (m, 3H, C(5)H and C(5)-$CH_2$); 3.76 (m, 1H, C(2)H); 5.03 (m, 2H, O$CH_2$Bn); 7.25-7.63 (m, 15H, arom and NH). $^{31}$P 45.04 (0.05 P, 2R diastereoisomer) and 45.70 (0.95 P, 2S diastereoisomer).

[(1R)-1-(benzyloxycarbonylamino)ethyl]-[(2S)-3-[[(1S)-2-tert-butoxy-1-methyl-2-oxo-ethyl]amino]-3-oxo-2-[(4-phenylphenyl)methyl]propyl]phosphinic acid (Compound D-a)

1.685 kg of compound (C-a) in 8.4 L of DMF are stirred at room temperature (20~25° C.) until a limpid solution is obtained then 763 g (4.2 moles) of H-Ala-OtBu.HCl and 3372 g (10.5 moles) of TBTU are added at room temperature. The mixture is cooled to ~5° C. and 2263 g (17.5 moles) of DIEPA are added, while maintaining the temperature at 5~10° C. After addition, the mixture is stirred at 5~10° C. for 45 min. 8.4 L of ethyl acetate are added at 5° C. as well as 10 L of an aqueous 1N HCl solution. The mixture is stirred at room temperature for 10 min. The aqueous phase is extracted with ethyl acetate (1×8.4 L) and the organic phases are combined and washed with a 10% aqueous $NaHCO_3$ solution (3×6 L), 3 L of a 1N HCl solution and 3 L of brine. The product, precipitated in the organic phase, is heated to 45~50° C. under stirring in 8 L of ethyl acetate until a limpid solution is obtained. After cooling thereof, the correct diastereoisomer is obtained in the form of a white solid by successive precipitation (1.314 kg) (Yield: 62%; 100% purity by HPLC).

NMR (DMSO D6+TFA): $^1$H (400 MHz) d 1.17 (m, C(2)$CH_3$, 3H); 1.22 (d, 3H, C(8)$H_3$); 1.36 (s, 9H, tBu); 1.61 and 1.93 (2 m, 1H+1H, C(4)$H_2$); 2.79 (m, 1H, C(5)H); 2.98 (m, 2H, C(5)$CH_2$); 3.72 (m, 1H, C(2)H); 4.11 (m, 1H, C(8)H); 5.01 (m, 2H, O$CH_2$Bn); 7.25-7.63 (m, 15H, arom and N(1)H) and 8.29 (d, 1H, N(7)H). $^{31}$P 45.95 (0.96 P, 2S diastereoisomer) and 46.22 (0.04 P, 2R diastereoisomer).

((2S)-3-([1,1'-biphenyl]-4-yl)-2-((((R)-1-aminoethyl)(hydroxy)phosphoryl)methyl) propanoyl)-L-alanine acid (Compound E (PL254.HBr))

1250 g (2.054 moles) of compound (D-a) are mixed under nitrogen flow in 2.5 L of acetic acid. The mixture is stirred at room temperature (15~20° C.) until all of the solid is dissolved, then is cooled to 10~15° C. and 2.99 kg (33%, 12.32 moles of HBr) of a solution of HBr in acetic acid are added slowly while maintaining the temperature at 16~20° C. After the addition over 5 h, while monitoring the progress of the reaction by HPLC, the mixture is concentrated at 18~20° C. under vacuum to remove around 400~500 mL of acetic acid and 6 L of ethyl acetate are added. The mixture is stirred at room temperature (15~20° C.) for 30 min then is filtered to isolate the solid product. This is washed with ethyl acetate (3×2 L) and diisopropyl ether (1×3 L) then is dried at 35° C. overnight under a flow of air to give 950 g of solid product (Yield: 92.7%; HPLC purity: 99.5%)

NMR (DMSO D6+TFA): $^1$H (400 MHz) d 1.22 (dd, 3H, C(2)$CH_3$); 1.30 (d, 3H, C(8)$H_3$); 1.64 and 2.19 (2 m, 1H+1H, C(4)$H_2$); 2.74 (m, 1H, C(5)H); 3.06 (m, 2H, C(5)$CH_2$); 3.26 (m, 1H, C(2)H); 4.23 (m, 1H, C(8)H); 7.36 (m, 3H, arom); 7.45 (m, 2H, arom); 7.60 (d, 2H, arom); 7.66 (d, 2H, arom); 7.70 (m, 9H, arom); 8.07 (br s, 3H, N(1)$H_3$+) and 8.53 (d, 1H, N(9)H). $^{31}$P 41.51 (0.98 P, 2S diastereoisomer) and 42.13 (0.02 P, 2R diastereoisomer).

HPLC purity (254 nm, Kromasil C18. 250 mm×4.6 mm, 5 μm) $H_2O$ (0.01% TFA) —$CH_3$CN (0.01% TFA) 90/10 during 2 min, then 10/90 in 14 min and 10/90 during 4 min: 99.5%; $t_R$ 10.31 and 11.25 min.

(2S)-2-[[[(1R)-1-(tert-butoxycarbonylamino)ethyl]-hydroxy-phosphoryl]methyl]-3-(4-phenylphenyl)propanoic acid (Compound C-b)

1N NaOH (2.2 mL; 1 equivalent) is added to a suspension of compound (B) (1 g; 2.21 mmol; 2R/2S 4/96) in EtOH (15 mL, 15 vol) and $H_2O$ (12 mL, 12 vol) cooled in an ice bath. The mixture is stirred at room temperature up to complete solubilisation. 10% Pd/C (0.15 g; 10% by weight with respect to compound (B) and 50% humid) was added. The reaction mixture was purged with $N_2$ then $H_2$ (3 cycles vac/$N_2$ then 3 cycles vac/$H_2$) and stirred for 18 h at 20-30° C., under 1 bar of $H_2$. The pH is recorded for information (pH of the order 7-8). The reaction mixture is filtered on 0.45 μm. 1N NaOH (2.2 mL, 1 equiv), $Boc_2O$ (0.5 g, 1 equiv) then 1N NaOH (2.2 mL, 1 equiv) are added successively. The mixture is stirred for 2 h at room temperature then is concentrated partially to remove EtOH. The aqueous phase is treated with 1N HCl up to pH<1 (0.655 g; 3 equiv). The suspension is treated with iBuOAc (1.28 g; 5 equivalent) and mixed for 2 h to give the solid. The solid is filtered then dried under reduced pressure to give compound (C-b) (0.837 g, 84%).

NMR (DMSO D6+TFA): $^1$H (400 MHz) d 1.17 (m, 3H, C(2)-$CH_3$); 1.36 (s, 9H, tBu); 1.71 and 1.97 (2m, 1H+1H, C(4)$H_2$); 2.9-3.1 (m, 3H, C(5)H and C(5)-$CH_2$); 3.70 (m, 1H, C(2)H); 7.01 (d, 1H, NH); 7.27 (d, 2H, arom); 7.34 (m, 1H, arom); 7.45 (m, 2H, arom); 7.57 (d, 2H, arom) and 7.64 (d, 2H, arom). $^{31}$P 46.4 (2S only diastereoisomer detected).

[(1R)-1-(tert-butoxycarbonylamino)ethyl]-[(2S)-3-[[(1S)-2-tert-butoxy-1-methyl-2-oxo-ethyl]amino]-3-oxo-2-[(4-phenylphenyl)methyl]propyl]phosphinic acid (Compound D-b)

TBTU (0.862 g; 3 equiv) then DIPEA (0.578 g, 5 equiv) are added successively to compound (C-b) (0.4 g; 0.895 mmol) and to the salt HCl. AlaOtBu (0.195 g; 1.2 equiv) in DMF (2 mL, 5 vol) at 0° C. The reaction mixture is stirred for 1 h then AcOEt (5 mL, 10 vol) and 1N HCl (2.55 mL; 2.85 equiv) are added and the mixture is left to return to room temperature. The aqueous phase is extracted with iBuOAc (2×2 mL, 2×5 vol). The organic phases are combined and washed with 10% $NaHCO_3$ (3×2 mL, 3×5 vol), 1N HCl (2 mL, 5 vol) and 10% NaCl (2 mL, 5 vol) then concentrated and dried under reduced pressure to give compound (D-b) in the form of a solid (0.356 g; 0.62 mmol; 69%).

NMR (DMSO D6+TFA): $^1$H (400 MHz) d 1.13 (m, C(2)CH$_3$, 3H); 1.23 (d, 3H, C(8)H$_3$); 1.36 (br s, 18H, 2×tBu); 1.59 and 1.91 (2 m, 1H+1H, C(4)H$_2$); 2.8 (m, 1H, C(5)H); 3.0 (m, 2H, C(5)CH$_2$); 3.65 (m, 1H, C(2)H); 4.11 (m, 1H, C(8)H); 6.80 (d, 1H, N(1)H); 7.31 and 7.34 (m, 3H, arom); 7.45 (m, 2H, arom); 7.54 (d, 2H, arom); 7.62 (d, 2H, arom) and 8.30 (d, 1H, N(7)H). $^{31}$P 46.5 (2S only diastereoisomer detected).
((2S)-3-([1,1'-biphenyl]-4-yl)-2-((((R)-1-aminoethyl)(hydroxy)phosphoryl)methyl) propanoyl)-L-alanine acid (Compound E (PL254))

88% HCO$_2$H (1 mL, 12 volumes) is added to compound (D-b) (85 mg; 0.148 mmol). The solution is heated to 50° C. under stirring for 2 h then concentrated to give an oil which is triturated in MTBE (2 mL, 24 volumes). The product is filtered then dried under reduced pressure to give compound (E) (58 mg, 94%).

NMR (DMSO D6+TFA): $^1$H (400 MHz) d 1.22 (dd, 3H, C(2)CH$_3$); 1.30 (dd, 3H, C(8)H$_3$); 1.64 and 2.18 (2 m, 1H+1H, C(4)H$_2$); 2.73 (m, 1H, C(5)H); 3.06 (m, 2H, C(5)CH$_2$); 3.25 (m, 1H, C(2)H); 4.23 (m, 1H, C(8)H); 7.30-7.70 (m, 9H, arom); 8.08 (br s, 3H, N(1)H$_3$+) and 8.52 (d, 1H, N(9)H). $^{31}$P 41.2 (2S 1 only diastereoisomer detected).

HPLC purity (254 nm, Kromasil C18, 250 mm×4.6 mm, 5 μm) H$_2$O (0.01% TFA) —CH$_3$CN (0.01% TFA) 90/10 for 2 min, then 10/90 in 14 min and 10/90 for 4 min: 97.70%; $t_R$10.29 min.

Synthesis of the Compound (E) by Successive Enrichment During Different Steps

Starting with a "raw" compound (B) (2S/2R) 57/43, derived for example from step (2b.2.1) such as described above, it has been shown that it is possible to enrich the desired diastereoisomer during different steps.

Compound (B) (2S/2R: 81/19)

The "raw" compound (B) (2S/2R) 57/43 is suspended in iBuOAc (50 mL, 5 volumes) and water (50 mL, 5 volumes) and is stirred for 2 hours. The suspension is filtered to give a humid cake (12 g). The solid is treated with acetone (50 mL, 5 volumes) and suspended for several minutes on the filter, then filtered, dried under vacuum to give the incorrect diastereoisomer (1R, 2R) (1.26 g, yield 24%, ratio 2R/2S $^{31}$P 79/21). The filtrate is concentrated to dryness to give the correct diastereoisomer (B) in solid form (3.18 g, yield 60%, (2S/2R): 81/19).

NMR D6 DMSO+TFA, $^{31}$P 39.37 (0.81 P, diastereoisomer 2S) and 39.60 (0.19 P, diastereoisomer 2R).

Compound (C-b) (2S/2R: 93/7)

1N NaOH (4.43 mL; 1 equivalent) is added to a suspension of compound (B) (2 g; 4.43 mmol; 2S/2R 81/19), obtained previously, in EtOH (30 mL, 15 vol) and H$_2$O (15 mL, 7.5 vol) cooled in an ice bath. The mixture is stirred at room temperature up to complete solubilisation. 10% Pd/C (0.20 g; 10% by weight with respect to compound (B) and 50% humid) was added. The reaction mixture was purged with N$_2$ then H$_2$ (3 cycles vac/N$_2$ then 3 cycles vac/H$_2$) and stirred for 18 h at 20-30° C., under 1 bar of H$_2$. The pH is recorded for information (pH of the order 7-8). The reaction mixture is filtered on 0.45 μm. 1N NaOH (4.4 mL, 1 equiv), Boc$_2$O (1.05 g, 1 equiv) then 1N NaOH (4.4 mL, 1 equiv) are added successively. The mixture is stirred for 2 h at room temperature then is concentrated partially to remove EtOH. The aqueous phase is washed with MTBE (10 mL, 5 volumes then with 1N HCl (1.75 mL, 4 equivalents). The organic phase is separated and concentrated to dryness to give a solid. This is suspended in MTBE (10 mL, 5 volumes) and H$_2$O (0.24 mL, 3 volumes) for 1 hour. The suspension is filtered then dried under vacuum to give compound (C-b) (1.05 g, yield 53%, 2S/2R=93/7).

NMR D6 DMSO+TFA, 31P 46.20 (diastereoisomer 2R; 0.07P) and 46.37 (diastereoisomer 2S; 0.93P).

Compound (D-b) (2S/2R 92/8)

TBTU (1.96 g; 3 equiv) then DIPEA (1.316 g, 5 equiv) are added successively to compound (C-b) (0.91 g; 2.04 mmol) obtained previously and to the salt HCl. AlaOtBu (0.44 g; 1.2 equiv) in DMF (5 mL, 5 volumes) at 0° C. The reaction mixture is stirred for 1 h then EtOAc (5 mL, 5 volumes) and 1N HCl (6 mL; 3 equiv) are added and the mixture is left to return to room temperature. The aqueous phase is extracted with EtOAc (4 mL, 2 volumes). The organic phases are combined then washed with 10% NaHCO$_3$ (3×4 mL, 3×2 volumes), 1N HCl (4 mL, 2 volumes) and 10% NaCl (4 mL, 2 volumes). The solution is concentrated and dried under vacuum to give compound (C-b) in solid form (1.058 g, 1.84 mmol, yield 90%, 2S/2R=92/8).

NMR D6 DMSO+TFA, $^{31}$P 46.56 (0.92 P, diastereoisomer 2S) and 46.88 (0.08 P, diastereoisomer 2R).

Compound (E) (2S/2R 93/7)

88% HCO$_2$H (5 mL, 12 volumes) is added to compound (D-b) obtained previously (1.06; 1.84 mmol). The solution is heated to 50° C. under stirring for 2 h then concentrated to give an oil which is triturated in MTBE (8 mL, 8 volumes). The mixture is concentrated and dried under vacuum to give compound (E) (0.62 g, yield 80%, (2S/2R): 93/7).

NMR D6 DMSO+TFA, $^{31}$P 41.33 (diastereoisomer 2S; 0.93P) and 41.97 (diastereoisomer 2R; 0.07P)

When compound (E) (0.5 g) is suspended in CH$_2$Cl$_2$ (4 mL, 8 volumes) it is stirred for 1 hour. The thin suspension is filtered and dried under vacuum to give compound (E) (0.45 mg, yield 72%, (2S/2R):94/6).

HPLC (254 nm, Kromasil C18, 250 mm×4.6 mm, 5 μm) H$_2$O (0.01% TFA) —CH$_3$CN (0.01% TFA) 90/10 for 2 min, then 10/90 in 14 min and 10/90 for 4 min) purity 98.2%; $t_R$:10.31 min.

((2S)-3-([1,1'-biphenyl]-4-yl)-2-((hydroxy((1R)-1-(((1-(isobutyryloxy)ethoxy) carbonyl)amino)ethyl)phosphoryl) methyl)propanoyl)-L-alanine acid (compound F)

900 g (1.8 moles) of compound (E) are solubilised in 2.7 L of DMF and the mixture is stirred at room temperature (15~20° C.) until a limpid solution is obtained. This is next cooled to 5~10° C. and 492.4 g (1.8 moles) of acyloxyalkyl carbamate are added in a portion and the mixture is stirred at 5~10° C. until a limpid solution is obtained. 382.3 g (3.79 moles) of triethylamine are added slowly, while maintaining the temperature below 15° C. After addition, the mixture is stirred at 15~20° C. for 4 h, while monitoring the reaction by HPLC. 4.5 L of ethyl acetate are added and the mixture is cooled to 5~10° C. to add an aqueous 1N HCl solution, to adjust the pH to 2 to 3 slowly, while maintaining the temperature below 25° C. (NB: around 2.2 L of an aqueous 1N HCl solution were used). 3.2 L of water are added and the mixture is stirred at room temperature for 10 min. The organic phase of the product is separated and the aqueous phase is extracted with ethyl acetate (1×4.5 L). The organic phases are mixed and washed with water (4×3.6 L) and brine (1×3.6 L). The organic phase is concentrated at 40~45° C. under reduced pressure, to remove around 90% of ethyl acetate. 2.7 L of ethyl acetate are added to the residue and the mixture is stirred at 45~50° C. for 30 min. The mixture is concentrated at 40~45° C. under vacuum to remove around 80% of ethyl acetate. 2.7 litres of diisopropyl ether are added to the residue and the mixture is continued to be concentrated to drive off the remaining ethyl acetate. 9 L of diisopropyl ether are then added and the mixture stirred at room temperature (~20° C.) for 1 h. The solid product is isolated and is dried overnight at 30~35° C. under air flow to give 925 g of compound (F), in the form of a light yellow solid (HPLC purity 98.1%).

Double sodium salt of ((2S)-3-([1,1'-biphenyl]-4-yl)-2-((hydroxy((1R)-1-(((1-(isobutyryloxy)ethoxy)carbonyl) amino)ethyl)phosphoryl)methyl) propanoyl)-L-alanine acid (compound (I))

136.27 g (0.24 mol) of compound (F) are solubilised in 683 mL of THF and the mixture is stirred at room temperature (15~25° C.) until a limpid solution is obtained. 137 mL of water are added to the solution which is next filtered at room temperature (15~25° C.) under N2 then sodium bicarbonate (39.71 g) is added at room temperature (15~25° C.). The mixture is stirred at room temperature (15~25° C.) for at least 30 min, up to disappearance of the gaseous release. The solution is concentrated under reduced pressure at 20~25° C. An operation of dilution of the residue by 1.0 L of THF then concentration at 20~25° C. under reduced pressure is carried out several times to remove water. 1.4 L of diisopropyl ether are added to the residue. The suspension is stirred under mechanical stirring at 15~25° C. for 1 h then the solid obtained is filtered, washed then dried to give 133.9 g of compound (1), in the form of an off-white solid (Yield: 91%; HPLC purity: 98.6%).

The invention claimed is:

1. A method for the industrial preparation of ((2S)-3-([1,1'-biphenyl]-4-yl)-2-((((R)-1-aminoethyl)(hydroxy)phosphoryl)methyl)propanoyl)-L-alanine acid of following formula (E):

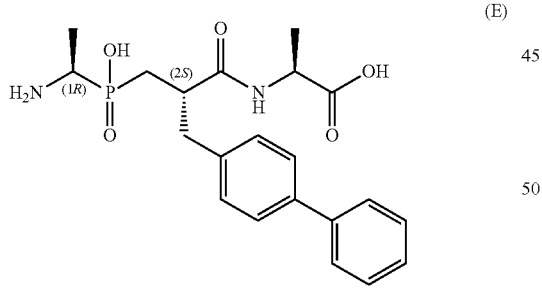

(E)

comprising the following steps:
(1) preparation of the compound of following formula (A):

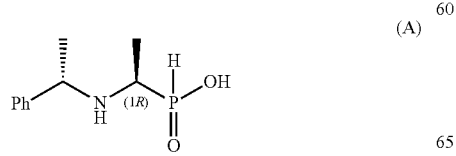

(A)

by:
(1a) reaction of (S)-1-phenylethylamine in a polar and protic solvent with an aqueous solution of hypophosphorous acid $H_3PO_2$ and acetaldehyde in the presence of a molar equivalent of hydrochloric acid with respect to (S)-1-phenylethylamine, then (1b) treatment of the salt resulting from step (1a) with propylene oxide, then (1c) crystallisation using a polar and protic solvent and recovery of the compound of formula (A) by filtration, (2) preparation of the compound of following formula (B):

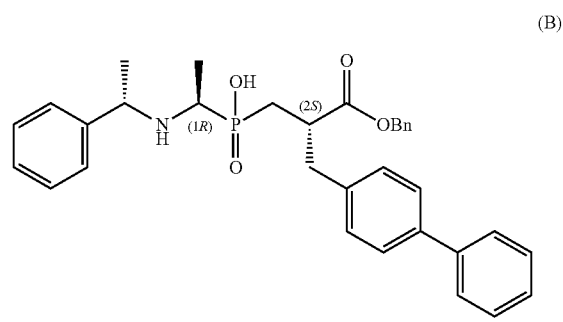 [SMILES: C[C@H](N[C@@H](C)P(=O)(O)C[C@@H](Cc1ccc(-c2ccccc2)cc1)C(=O)OCc1ccccc1)c1ccccc1]

(B)

by:
(2a) reaction of the compound of formula (A) derived from step (1) with the benzylic ester of (2-(4-biphenyl)methyl)acrylate in the presence of a source of trimethylsilyl groups, then
(2b) recovery of the compound of formula (B) by:
(2b.1) crystallisation using a mixture of apolar aprotic solvent and water then filtration, or
(2b.2) trituration in acetone, filtration and evaporation of the filtrate, (3) preparation of the compound of following formula (C):

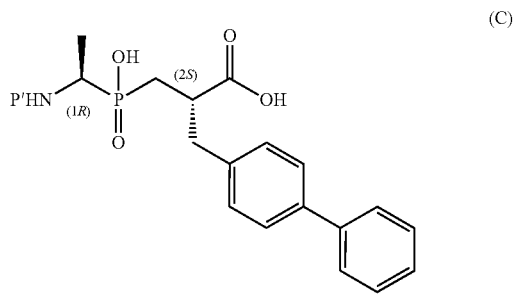

(C)

in which P' is a protective group of the amine function, by:
(3a) hydrogenolysis of the compound of formula (B) under hydrogen atmosphere in the presence of 10% by weight of Pd/C compared to the weight of the compound of formula (B), then
(3b) protection of the amine resulting from step (3a) with a protective group P' and recovery of the compound of formula (C), (4) preparation of the compound of formula (E) by
(4a) peptide coupling of the compound of formula (C) with the tert-butyl ester of (L)-alanine and recovery of the compound of following formula (D):

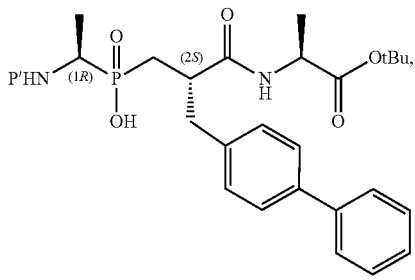

(4b) deprotection of the protective group P' in N-terminal position and the tert-butyl group in C-terminal position and recovery of the compound of formula (E).

2. The method according to claim 1, wherein in steps (1a) and (1c), the polar and protic solvent is selected from among alcohols.

3. The method according to claim 1, wherein in step (2b) the apolar aprotic solvent is MTBE.

4. The method according to claim 1, wherein step (3a) comprises the following successive steps:
   (3a.1) preparation of a suspension comprising the compound of formula (B) in a protic solvent or a mixture of protic solvents,
   (3a.2) addition of a base to the suspension prepared at step (3a.1),
   (3a.3) addition to the suspension resulting from step (3a.2) of 10% by weight of Pd/C with respect to the weight of compound of formula (B) and purge of the resulting reaction mixture with $H_2$,
   (3a.4) filtration and concentration of the reaction mixture.

5. The method according to claim 1, wherein the protection step (3b) is carried out in basic medium.

6. The method according to claim 1, wherein P' is selected from among groups constituted of CBz and Boc groups.

7. The method according to claim 1, wherein step (4a) comprises the following successive steps:
   (4a.1) addition of the tert-butyl ester of (L)-alanine and a peptide coupling agent to a solution comprising the compound of formula (C) dissolved in DMF or in a THF/DMF mixture,
   (4a.2) addition of a base to the reaction mixture resulting from step (4a.1),
   (4a.3) recovery of the compound of formula (D).

8. A method for the industrial preparation of the disodium salt of ((2S)-3-([1,1'-biphenyl]-4-yl)-2-((hydroxy((1R)-1-(((1-(isobutyryloxy)ethoxy)carbonyl)amino)ethyl)phosphoryl)methyl) propanoyl)-L-alanine of following formula (I):

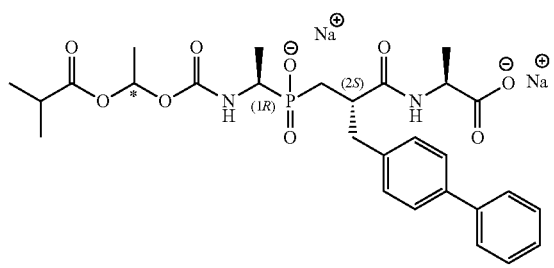

comprising steps (1) to (4) as defined according to claim 1 and, directly following step (4), the following successive steps (5) and (6):

(5) preparation of the compound of following formula (F):

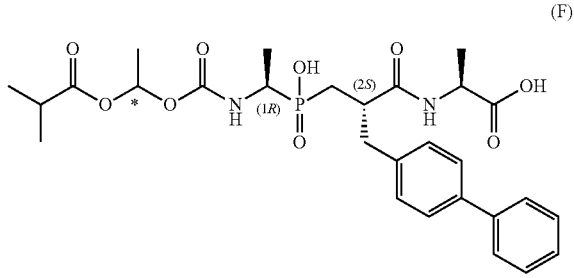 [SMILES: CC(OC(=O)N[C@@H](C)P(=O)(O)C[C@@H](Cc1ccc(-c2ccccc2)cc1)C(=O)N[C@@H](C)C(=O)O)OC(=O)C(C)C]

by reaction of the compound of formula (E) with acyloxyalkyl N-hydroxysuccinimide in the presence of a base, (6) recovery of the compound of formula (I) by precipitation in an apolar aprotic solvent in the presence of a sodium salt of a weak base.

9. The method according to claim 8, wherein step (5) comprises the following successive steps:
   (5a) reaction of the compound of formula (E) with acyloxyalkyl N-hydroxysuccinimide in the presence of a base in a polar aprotic solvent,
   (5b) crystallisation using an aprotic apolar solvent and recovery of the compound of formula (F) by filtration.

10. A compound of following formula (B):

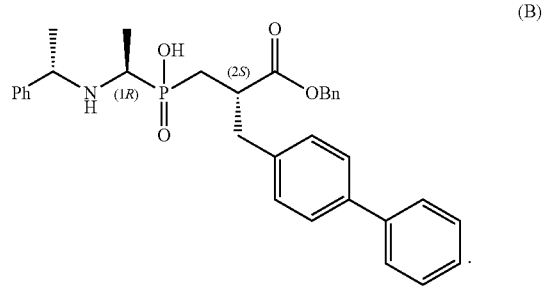 [SMILES: C[C@H](N[C@@H](C)P(=O)(O)C[C@@H](Cc1ccc(-c2ccccc2)cc1)C(=O)OCc1ccccc1)c1ccccc1]

11. The method according to claim 2, wherein in steps (1a) and (1c), the polar and protic solvent is ethanol.

12. The method according to claim 5, wherein the protection step (3b) is carried out by addition of a strong base.

13. The method according to claim 12, wherein the strong base is NaOH, LiOH, KOH, Ba(OH)$_2$, Ca(OH)$_2$ or CsOH.

* * * * *